(12) United States Patent
Toyama et al.

(10) Patent No.: US 7,383,444 B2
(45) Date of Patent: Jun. 3, 2008

(54) INFORMATION PROCESSING SYSTEM, INFORMATION PROCESSING APPARATUS, METHOD OF CONTROLLING THE INFORMATION PROCESSING APPARATUS, DISK ARRAY DEVICE, METHOD OF CONTROLLING THE DISK ARRAY DEVICE, METHOD OF CONTROLLING DISPLAY OF THE DISK ARRAY DEVICE, AND CONTROL PROGRAMS FOR IMPLEMENTING THE METHODS

(75) Inventors: Takeshi Toyama, Kanagawa (JP); Noriyuki Suzuki, Tokyo (JP); Tadashi Takayama, Kanagawa (JP); Tomoyuki Takada, Tokyo (JP)

(73) Assignee: Canon Kabushiki Kaisha (JP)

( * ) Notice: Subject to any disclaimer, the term of this patent is extended or adjusted under 35 U.S.C. 154(b) by 764 days.

(21) Appl. No.: 10/854,122

(22) Filed: May 26, 2004

(65) Prior Publication Data

US 2004/0255149 A1    Dec. 16, 2004

(30) Foreign Application Priority Data

May 27, 2003  (JP) ............................. 2003-149604
May 27, 2003  (JP) ............................. 2003-149605

(51) Int. Cl.
*H04L 9/32*     (2006.01)
*G06F 11/30*    (2006.01)
*G06F 12/14*    (2006.01)

(52) U.S. Cl. .................. 713/192; 713/193; 726/17
(58) Field of Classification Search ................ 726/17; 713/192–193; 711/100, 114–115
See application file for complete search history.

(56) References Cited

U.S. PATENT DOCUMENTS

| 5,835,700 | A  | * | 11/1998 | Carbonneau et al. ......... 714/44 |
| 5,966,510 | A  | * | 10/1999 | Carbonneau et al. ......... 714/44 |
| 6,052,785 | A  | * | 4/2000 | Lin et al. ........................ 726/5 |
| 6,557,049 | B1 | * | 4/2003 | Maloy et al. ................... 710/8 |
| 6,658,504 | B1 | * | 12/2003 | Lieber et al. ................. 710/52 |
| 6,684,343 | B1 | * | 1/2004 | Bouchier et al. .............. 714/4 |
| 6,853,551 | B2 | * | 2/2005 | Baar et al. .................. 361/687 |
| 6,942,144 | B2 | * | 9/2005 | Brookner ..................... 235/382 |
| 6,959,399 | B2 | * | 10/2005 | King et al. ..................... 714/6 |

(Continued)

FOREIGN PATENT DOCUMENTS

JP    4-6685 (A)    1/1992

(Continued)

*Primary Examiner*—Nasser Moazzami
*Assistant Examiner*—David Garcia Cervetti
(74) *Attorney, Agent, or Firm*—Rossi, Kimms & McDowell LLP

(57) ABSTRACT

An information processing system which is capable of promptly authenticating a combination of a disk array device accommodating a plurality of disk devices, and an information processing apparatus in which the disk array device is mounted. A first control section of a cartridge device as a disk array device stores ID information for use in authentication by an information processing apparatus, and a second control section of the information processing apparatus acquires the ID information from the first control section. The second control section authenticates the cartridge device by using the acquired ID information. A third control section of the information processing apparatus reads out information from hard disk devices contained in the cartridge device when the authentication by the second control section is successful.

6 Claims, 14 Drawing Sheets

U.S. PATENT DOCUMENTS

| | | | |
|---|---|---|---|
| 6,968,463 B2 * | 11/2005 | Pherson et al. | 726/3 |
| 7,036,021 B2 * | 4/2006 | Koguchi et al. | 713/194 |
| 7,073,037 B2 * | 7/2006 | Okuyama et al. | 711/164 |
| 7,085,961 B2 * | 8/2006 | Chang et al. | 714/13 |
| 7,165,152 B2 * | 1/2007 | Blumenau et al. | 711/152 |
| 7,249,168 B1 * | 7/2007 | Ryder | 709/220 |
| 2002/0095602 A1 * | 7/2002 | Pherson et al. | 713/201 |
| 2003/0093721 A1 * | 5/2003 | King et al. | 714/42 |
| 2004/0104652 A1 * | 6/2004 | Holmes et al. | 312/348.3 |
| 2004/0225719 A1 * | 11/2004 | Kisley et al. | 709/212 |

FOREIGN PATENT DOCUMENTS

| | | |
|---|---|---|
| JP | 6-290569 (A) | 10/1994 |
| JP | 7-114501 (A) | 5/1995 |
| JP | 9-6548 (A) | 1/1997 |
| JP | 9-259570 (A) | 10/1997 |
| JP | 11-282752 A | 10/1999 |
| JP | 2001-229352 A | 8/2001 |

* cited by examiner

INFORMATION PROCESSING SYSTEM, INFORMATION PROCESSING APPARATUS, METHOD OF CONTROLLING THE INFORMATION PROCESSING APPARATUS, DISK ARRAY DEVICE, METHOD OF CONTROLLING THE DISK ARRAY DEVICE, METHOD OF CONTROLLING DISPLAY OF THE DISK ARRAY DEVICE, AND CONTROL PROGRAMS FOR IMPLEMENTING THE METHODS

BACKGROUND OF THE INVENTION

1. Field of the Invention

The present invention relates to an information processing system, an information processing apparatus, a method of controlling the information processing apparatus, a disk array device, a method of controlling the disk array device, a method of controlling display of the disk array device, and control programs for implementing the methods, and more particularly to an information processing system, an information processing apparatus, a method of controlling the information processing apparatus, a disk array device, a method of controlling the disk array device, a method of controlling display of the disk array device, and control programs for implementing the methods, which are capable of authenticating a combination of the information processing apparatus and the disk array device and then reading out information from the disk array device.

2. Description of the Related Art

In recent years, hard disk devices have drawn attention as removable media allowing high-speed access and large-capacity recording. Hard disk devices are widely used as media for use in personal computers as well as in household electrical appliances, such as copying machines, printing apparatuses, and AV (audio-visual) apparatuses.

The hard disk device is advantageous in improving security, because unauthorized access can be prevented by removing the hard disk device from an information processing apparatus.

In many cases, the hard disk device is used as a so-called system disk storing a program for booting an information processing apparatus to which the hard disk device is connected, and a system program (operating system) for controlling and managing the hardware and software resources of the booted information processing apparatus.

However, when an unauthorized system disk is mounted in the information processing apparatus, there arise the following problems:

(1) The hardware and software resources of the information processing apparatus can be unauthorizedly used or tampered; and (2) A network system can be unauthorizedly invaded via the information processing apparatus.

Therefore, it is desired that an information processing system comprised of an information processing apparatus and a hard disk device should be started after authenticating a combination of the information processing apparatus and the hard disk device.

To this end, a technique has been disclosed e.g. in Japanese Laid-Open Patent Publication (Kokai) No. H07-114501, in which when an identification number stored in an information processing apparatus and an identification number stored in a medium (disk) of a hard disk device mounted in the information processing apparatus are identical, the information processing apparatus is allowed to be started using the hard disk device.

However, the technique disclosed in the above-mentioned publication requires to set up the hard disk device such that data on the disk can be read, before the information processing apparatus reads out the identification number from the hard disk device and compares the same with the identification number stored in the information processing apparatus itself. The process for setting up the hard disk device includes disk spin-up processing, and hence it takes a long time to authenticate the combination of the information processing apparatus and the hard disk device.

For example, to find out a hard disk device to be mounted in the information processing apparatus for use from a plurality of hard disk devices, it is necessary to carry out the operation of mounting and removing a hard disk device many times, and it takes a long time to carry out authentication of each hard disk device. Therefore, much time is needed to find the desired hard disk device.

Further, a RAID (Redundant Arrays of Inexpensive Disks) technique has become popular in which data is stored in a distributed fashion with redundancy in a disk array comprised of a plurality of hard disk devices (hereinafter referred to as the "disk array device"), for the purpose of enhancing the reliability and capacity of the hard disk devices.

However, even with the RAID technique, a technique of quickly authenticating a combination of a disk array device comprised of a plurality of hard disk devices and an information processing apparatus in which the hard disk array is mounted has naturally not been realized.

Furthermore, techniques disclosed e.g. in Japanese Laid-Open Patent Publications (Kokai) No. H04-6685, No. H06-290569, and No. H09-259570 have been proposed for single storage media and single storage devices, not for disk array devices, and hence have some weak points when applied to a portable disk array device.

In a disk array device, the entire array structure is regarded as a single disk drive, so that in the case of a disk array device having a display device provided for each disk drive or storage medium (hereinafter referred to as "the disk drive" or "a disk drive"), identical contents are displayed on all the display devices. This is very redundant, and increases the number of component parts and the manufacturing costs. Further, unless each display device is well positioned, the display can be covered by support members of the array structure, or by another disk drive as a component of the array. In addition, it is disadvantageous in terms of manufacturing costs because special disk drives each provided with a display device are required so as to form a disk array device.

On the other hand, Japanese Laid-Open Patent Publication (Kokai) No. H09-6548 has proposed another example of the disk array device. Although this publication contains a description related to display (information related to access status and failure) presented when an array cartridge as a replaceable part of the disk array device is mounted in the body of the disk array device, but contains no disclosure of display presented when the array cartridge is not mounted in the body of the disk array device.

Moreover, in a disk array device, each disk drive is separately replaceable in case of failure of a disk drive, and therefore an improper combination of disk devices can be mounted due to human error or unauthorized use. None of the conventional techniques teach how to display in such a case.

SUMMARY OF THE INVENTION

It is a first object of the present invention to provide an information processing system, an information processing apparatus, a method of controlling the information processing apparatus, a disk array device, a method of controlling the disk array device, and control programs for implementing the methods, which are capable of promptly authenticating a combination of the disk array device accommodating a plurality of disk devices, and the information processing apparatus in which the disk array device is mounted.

It is a second object of the present invention to provide a disk array device, a method of controlling display of the disk array device, and a control program for implementing the method, which make it possible to eliminate redundancy of displaying the same contents on a plurality of display devices, reduce the number of component parts and manufacturing costs, and enable a user to recognize the possibility of disk devices within the disk array device having been unauthorizedly used.

To attain the above first object, in a first aspect of the present invention, there is provided an information processing system comprising an information processing apparatus, a plurality of disk devices, and a disk array device accommodating the disk devices and removably mounted in the information processing apparatus, wherein the disk array device comprises a storage device that stores authentication information for use in authentication by the information processing apparatus, and the information processing apparatus comprises an acquiring device that acquires the authentication information from the storage device, an authenticating device that performs a process for authenticating the disk array device by using the authentication information acquired by the acquiring device, and a reading device that reads out information from at least one of the disk devices, the reading device reading out the information from at least one of the disk devices when authentication by the authenticating device is successful.

With the arrangement of the information processing system according to the first aspect of the present invention, it is possible to promptly authenticate a combination of the disk array device accommodating a plurality of disk devices, and the information processing apparatus in which the disk array device is mounted, which provides increased convenience to users.

Preferably, when the authenticating device fails in the authentication based on the authentication information acquired from the storage device by the acquiring device, the authenticating device performs a further process for authenticating the disk array device by using manually inputted information.

Preferably, the disk array device comprises a cover that openably covers the disk devices, for allowing any of the disk devices to be taken out from the disk array device, a detecting device that detects that the cover is opened, and a storage control device that stores in the storage device information indicative of a fact that the cover was opened, detected by the detecting device, and even in a case where the authenticating device has been successful in the authentication based on the authentication information acquired from the storage device is successful, the authenticating device is responsive to acquisition of the information indicative of the fact that the cover was opened, for performing a further process for authenticating the disk array device by using manually inputted information.

Preferably, the information processing apparatus comprises a changing device that automatically changes the authentication information stored in the storage device, after the disk array device has been authenticated by the authenticating device.

To attain the above first object, in a second aspect of the present invention, there is provided an information processing apparatus that is capable of having a disk array device removably mounted therein, the disk array device accommodating a plurality of disk devices, and including a storage device that stores predetermined authentication information, comprising an acquiring device that acquires the authentication information from the storage device, an authenticating device that performs a process for authenticating the disk array device by using the authentication information acquired by the acquiring device, and a reading device that reads out information from at least one of the disk devices, and the reading device reads out the information from at least one of the disk devices when the authenticating device is successful in authenticating the disk array device.

Preferably, when the authenticating device fails in the authentication based on the authentication information acquired from the storage device by the acquiring device, the authenticating device performs a further process for authenticating the disk array device by using manually inputted information.

Preferably, the disk array device comprises a cover that openably covers the disk devices, for allowing any of the disk devices to be taken out from the disk array device, a detecting device that detects that the cover is opened, and a storage control device that stores in the storage device information indicative of a fact that the cover was opened, detected by the detecting device, and even in a case where the authenticating device has been successful in the authentication based on the authentication information acquired from the storage device, the authenticating device is responsive to acquisition of the information indicative of the fact that the cover was opened, for performing a further process for authenticating the disk array device by using manually inputted information.

Preferably, the information processing apparatus comprises a changing device that automatically changes the authentication information stored in the storage device, after the disk array device has been authenticated by the authenticating device.

To attain the above first object, in a third aspect of the present invention, there is provided a disk array device accommodating a plurality of disk devices and mounted in an information processing apparatus for use thereby, comprising a storage device, a storage control device that stores in the storage device authentication information transferred from the information processing apparatus, for use in authentication by the information processing apparatus, and a notifying device that is responsive to a request from the information processing apparatus, for notifying the authentication information stored in the storage device by the storage control device to the information processing apparatus.

Preferably, the disk array device comprises a cover that openably covers the disk devices, for allowing any of the disk devices to be taken out from the disk array device, and a detecting device that detects that the cover is opened, and the storage control device stores in the storage device information indicative of a fact that the cover was opened, detected by the detecting device, the notification device being responsive to a request from the information processing apparatus, for notifying the authentication information indicative of the fact that the cover was opened, the authentication information having been stored by the storage control device, to the information processing apparatus.

To attain the above first object, in a fourth aspect of the present invention, there is provided a method of controlling an information processing apparatus that is capable of having a disk array device removably mounted therein, the disk array device accommodating a plurality of disk devices and having a storage device that stores predetermined authentication information, the method comprising the steps of acquiring the predetermined authentication information from the storage device, authenticating the disk array device by using the acquired authentication information, and reading out information from at least one of the disk devices when the disk array device is successfully authenticated.

To attain the above first object, in a fifth aspect of the present invention, there is provided a method of controlling a disk array device accommodating a plurality of disk devices, the disk array device including a storage device and being mounted in an information processing apparatus for use thereby, the method comprising the steps of storing in the storage device authentication information transferred from the information processing apparatus, for use in authentication by the information processing apparatus, and reading out the stored authentication information in response to a request from the information processing apparatus to notify the authentication information to the information processing apparatus.

To attain the above first object, in a sixth aspect of the present invention, there is provided a control program for causing a computer to execute a method of controlling an information processing apparatus that is capable of having a disk array device removably mounted therein, the disk array device accommodating a plurality of disk devices and including a storage device that stores predetermined authentication information, the control program comprising a reading module for acquiring the authentication information from the storage device, an authenticating module for authenticating the disk array device by using the acquired authentication information, and a reading module for reading out information from at least one of the disk devices when the disk array device is successfully authenticated.

To attain the above first object, in a seventh aspect of the present invention, there is provided a control program for executing a method of controlling a disk array device accommodating a plurality of disk devices, the disk array device including a storage device and being mounted in an information processing apparatus, for use, the control program comprising a storing module for storing in the storage device authentication information transferred from the information processing apparatus, for use in authentication by the information processing apparatus, and a notifying module for notifying the stored authentication information to the information processing apparatus in response to a request from the information processing apparatus.

To attain the above second object, in an eighth aspect of the present invention, there is provided a disk array device that removably accommodates a plurality of disk devices forming an array structure and is removably mounted in an information processing apparatus, comprising an information storage device that stores identification information for identifying an entirety of the array structure of the disk devices, a display device provided for the entirety of the array structure, for displaying the identification information, a connecting device that controls interfacing with the information processing apparatus when the disk array device is mounted in the information processing apparatus, and a power supply device that supplies electric power to the disk devices accommodated in the disk array device.

With the arrangement of the disk array device according to the eighth aspect of the present invention, the disk array device containing a plurality of disk devices is provided with a single display device, not for each of the disk devices but for the entire array structure, so as to display identification information (at least any of a title label, a volume name, an ID number, etc.) for identifying the entire array structure on the display device. Therefore, compared with the conventional disk array device having display devices provided for respective disk devices, it is possible to eliminate redundancy of displaying the same contents on a plurality of display devices, and reduce the number of component parts and manufacturing costs.

Preferably, the identification information stored in the information storage device contains at least one selected from the group consisting of a title label, a volume name, and an identification number, the identification information being rewritable and being written into the information processing apparatus in response to an instruction given from the information processing apparatus via the connecting device.

Preferably, the disk array device comprises a cover provided on the disk array device, for openably covering receiving ports provided in the disk array device, for receiving the disk devices, a detecting device that detects open and closed states of the cover, and a display control device that changes contents to be displayed on the display device, based on a result of the detection by the detecting device.

More preferably, the disk array device comprises an opening/closing-storing device that stores the result of the detection by the detecting device, and the display control device changes the contents to be displayed on the display device, based on the result of the detection by the detecting device.

Still more preferably, the display control device is responsive to a result of the detection by the detecting device that the cover was closed when the disk array device was not mounted in the information processing apparatus being stored in the opening/closing-storing device, for causing the display device to display the identification information, and is responsive to a result of the detection by the detecting device that the cover was opened when the disk array device was not mounted in the information processing apparatus being stored in the opening/closing-storing device, for causing the display device to display a message to the effect that the cover was opened.

Still more preferably, the disk array device comprises a locking device that locks the cover, an instructing device that gives an instruction for unlocking the cover, and a locking control device that causes the locking device to lock the cover when the cover is closed, and causes the locking device to unlock the cover when the instruction for unlocking the cover is given by the instructing device.

Still more preferably, the display control device is responsive to a result of the detection by the detecting device that the cover was opened when the disk array device was not mounted in the information processing apparatus being stored in the opening/closing-storing device, for changing contents to be displayed on the display device, depending on whether or not the cover was opened in response to the instruction for unlocking the cover, given by the instructing device.

Still more preferably, the display control device is responsive to the cover having been opened in response to the instruction for unlocking the cover, given by the instructing device when the disk array device was not mounted in the information processing apparatus being stored in the opening/closing-storing device, for displaying a message to the effect that the cover was opened in response to the instruction for unlocking the cover by the instructing device, and is responsive to the opening of the cover having not been caused by the instruction for unlocking the cover by the instructing device, for causing the display device to display a message to the effect that the cover was unauthorizedly opened.

To attain the above second object, in a ninth aspect of the present invention, there is provided a display control method of controlling display of a disk array device removably accommodating a plurality of disk devices forming an array structure and being removably mounted in an information processing apparatus, the disk array device including a display device that displays information, and a cover that openably covers receiving ports provided in the disk array device, for receiving the disk devices, the method comprising the steps of detecting open and closed states of the cover, storing a result of the detection, causing the display device to display information for identifying an entirety of the array structure, in response to the stored result of the detection that the cover was closed when the disk array device was not mounted in the information processing apparatus, and causing the display device to display a message to the effect that the cover was opened, in response to the stored result of the detection that the cover was opened when the disk array device was mounted in the information processing apparatus.

With the arrangement of the display control method according to the ninth aspect of the present invention, the display device is caused to display information for identifying an entirety of the array structure, when there is stored the result of the detection that the cover was closed when the disk array device was not mounted in the information processing apparatus, and display a message to the effect that the cover was opened, when there is stored the result of the detection that the cover was opened when the disk array device was mounted in the information processing apparatus. Therefore, the user can recognize the possibility of the disk devices within the disk array device having been tampered or unauthorizedly used.

Preferably, the cover can be locked and unlocked by a locking device, and the display control method further comprises the steps of causing the display device to display a message to the effect that the cover was opened in response to an instruction from the instructing device, when the cover was opened in response to the instruction for unlocking the cover when the disk array device was not mounted in the information processing apparatus, and causing the display device to display a message to the effect that the cover was unauthorizedly opened, when the opening of the cover was not caused by the instruction for unlocking the cover.

With the arrangement of this preferred embodiment, the display device is caused to display a message to the effect that the cover was opened in response to an instruction from the instructing device, when the cover was opened in response to the instruction for unlocking the cover when the disk array device was not mounted in the information processing apparatus, and display the message to the effect that the cover was unauthorizedly opened, when the opening of the cover was not caused by the instruction for unlocking the cover. That is, the locking device is provided for locking and unlocking the cover of the disk array device, and the display device does not simply display information indicating that the cover was opened, but displays different information depending on the manner of opening of the cover (i.e. whether the cover was opened authorizedly or unauthorizedly). Therefore, this method is very effective in detecting and preventing unauthorized use or tampering of the disk devices within the disk array device.

To attain the above second object, in a tenth aspect of the present invention, there is provided a control program for causing a computer to execute a display control method of controlling display of a disk array device removably accommodating a plurality of disk devices forming an array structure and being removably mounted in an information processing apparatus, the disk array device including a display device that displays information, and a cover that openably covers receiving ports provided in the disk array device, for receiving the disk devices, the control program comprising a detecting module for detecting open and closed states of the cover, a storing module for storing a result of the detection, a first display control module for causing the display device to display information for identifying an entirety of the array structure, in response to the stored result of the detection that the cover was closed when the disk array device was not mounted in the information processing apparatus, and a second display control module for causing the display device to display a message to the effect that the cover was opened, in response to the stored result of the detection that the cover was opened when the disk array device was not mounted in the information processing apparatus.

The above and other objects, features, and advantages of the invention will become more apparent from the following detailed description taken in conjunction with the following drawings.

BRIEF DESCRIPTION OF THE DRAWINGS

FIGS. 1A to 1F are perspective views showing the appearances of an information processing system, a disk array device, an information processing apparatus, and a hard disk device, according to a first embodiment of the present invention, in which:

FIG. 1A shows the disk array device with a handle thereof folded;

FIG. 1B shows the disk array device with the handle thereof raised;

FIG. 1C shows the disk array device with a cover thereof open;

FIG. 1D shows the information processing apparatus;

FIG. 1E shows the disk array device as viewed obliquely from below and the front; and FIG. 1F shows the hard disk device;

DETAILED DESCRIPTION OF THE PREFERRED EMBODIMENTS

Figure 1A:
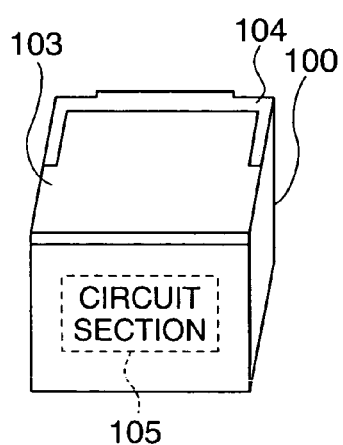

The present invention will now be described in detail below with reference to the drawings showing preferred embodiments thereof.

FIGS. 1A to 1F are views useful in explaining the constructions of an information processing system, a disk array device, an information processing apparatus, and a hard disk device, according to a first embodiment of the present invention. Reference numeral 100 designates a cartridge device as the disk array device, and 102 designates the information processing apparatus that accommodates and uses the cartridge device 100 connected thereto. The cartridge device 100 is capable of accommodating a plurality of hard-disk devices 101a to 101d. In the following description, each of the hard disk devices 101a to 101d is sometimes generically referred to as the hard disk device 101.

Figure 1B:
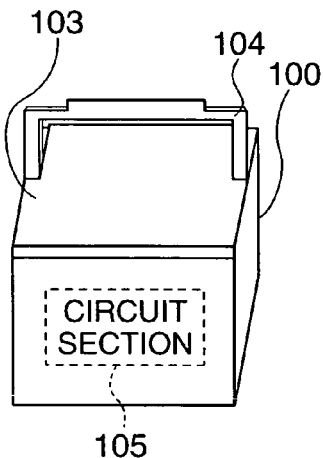
Figure 1C:
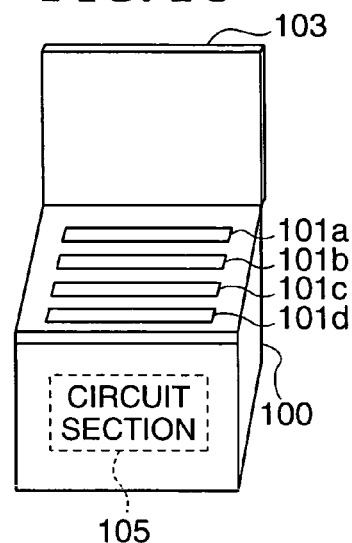
Figure 1D:
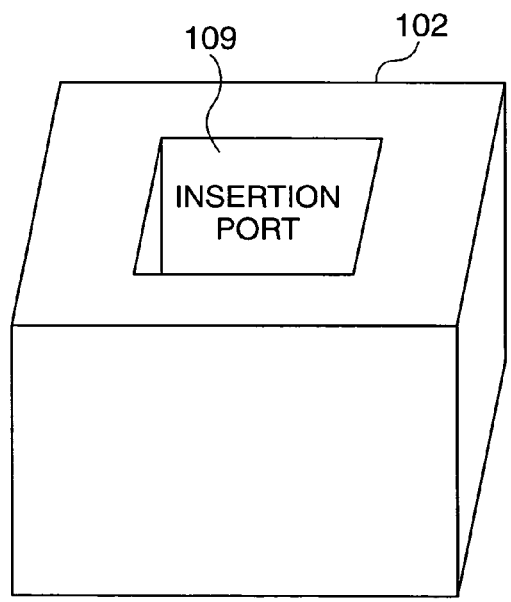
Figure 1E:
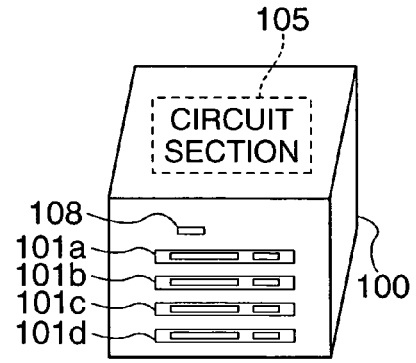
Figure 1F:
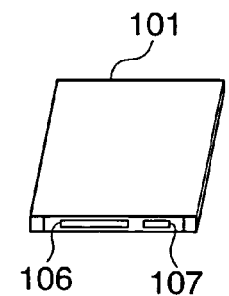

FIG. 1A is a perspective view showing the appearance of the cartridge device 100, as viewed obliquely from above and the front, with a handle 104 thereof folded, while FIG. 1B is a perspective view showing the appearance of the same, as viewed obliquely from above and the front, with the handle 104 thereof raised. FIG. 1C is a perspective view showing the appearance of the cartridge device 100, as viewed obliquely from above and the front, with a cover 103 thereof open. FIG. 1D is a perspective view showing the appearance of the information processing apparatus 102 with an array cartridge insertion port 109, as viewed obliquely from above and the front. FIG. 1E is a perspective view showing the appearance of the cartridge device 100, as viewed obliquely from below and the front. FIG. 1F is a perspective view showing the appearance of the hard disk device 101 for being accommodated in the cartridge device 100.

First, a description will be given of the cartridge device 100. The cartridge device 100 includes a circuit section 105 that is responsible for part of various operations of the cartridge device 100. This circuit section 105 includes a first control section 200 (see FIG. 2), described in detail hereinafter. FIG. 1A shows the appearance of the cartridge device 100 in a state where it is inserted into the insertion port 109 of the information processing apparatus 102 shown in FIG. 1D and connected thereto.

To remove the cartridge device 100 from the insertion port 109 of the information processing apparatus 102, a user raises the handle 104 from the cartridge device 100, as shown in FIG. 1B, and pulls up the same. Then, the user can easily remove the cartridge device 100.

The cartridge device 100 is capable of accommodating a plurality of hard disk devices 101, four at the maximum in the present embodiment. To insert a hard disk device 101 into the cartridge device 100 or remove the same, the cover 103 of the cartridge device 100 is opened, as shown in FIG. 1C.

In the present embodiment, the four hard disk devices 101a to 101d are mounted in the cartridge device 100, as shown in FIG. 1C, and the cartridge device 100 is used as the disk array device. In this case, the hard disk devices 101a to 101d each store important information including a system program for operating the information processing apparatus 102, and therefore the information is protected by a RAID (Redundant Arrays of Inexpensive Disks) technique.

As shown in FIG. 1F, the hard disk device 101 (101a, 101b, 101c, or 101d) has connectors for connection to the information processing apparatus 102, i.e. a communication connector 106 via which various kinds of signals are communicated, and a power connector 107 via which electric power is supplied to the hard disk device 101.

As shown in FIG. 1E, the cartridge device 100 has the lower surface (i.e. the connecting surface for connection to the information processing apparatus 102: the bottom surface) formed therein with openings, similarly to the upper surface thereof. In a state where the hard disk devices 101a to 101d have been inserted into the cartridge device 100, the communication connector 106 and the power connector 107 of each of the hard disk devices 101a to 101d are exposed to the outside from the lower surface of the cartridge device 100, for connection to respective associated connectors (not shown) of the information processing apparatus 102.

Further, on the bottom surface of the cartridge device 100, there is provided a circuit connector 108 via which various kinds of information are exchanged between the circuit section 105 of the cartridge device 100 and the information processing apparatus 102. Although not shown, the information processing apparatus 102 has a surface thereof defining the bottom of the insertion port 109, on which are provided connectors associated, respectively, with the communication connectors 106 and power connectors 107 of the hard disk devices 101a to 101d, and the circuit connector 108.

When the present information processing system is used, it is preferable that the user mounts the cartridge device 100 having the hard disk devices 101 accommodated therein in the information processing apparatus 102 before starting to use the information processing apparatus 102, and removes the cartridge device 100 from the information processing apparatus 102 after finishing using the information processing apparatus 102. The removed cartridge device 100 contains the hard disk devices 101 storing important information, and therefore it is preferable to store the same in a safe or the like under lock and key.

This makes it possible to protect the information stored in the hard disk devices 101 accommodated in the cartridge device 100 from being stolen or tampered. Further, when the information processing apparatus 102 is not used by an authorized user, the cartridge device 100 is no longer mounted in the apparatus 102, and therefore it is possible to prevent unauthorized use of the information processing apparatus 102.

Hereafter, the state where the cartridge device 100 is not mounted in the information processing apparatus 102 will be referred to as "the off-line state" for convenience of description.

Next, a description will be given of the arrangement and operation of the information processing system according to the present embodiment.

Figure 2:
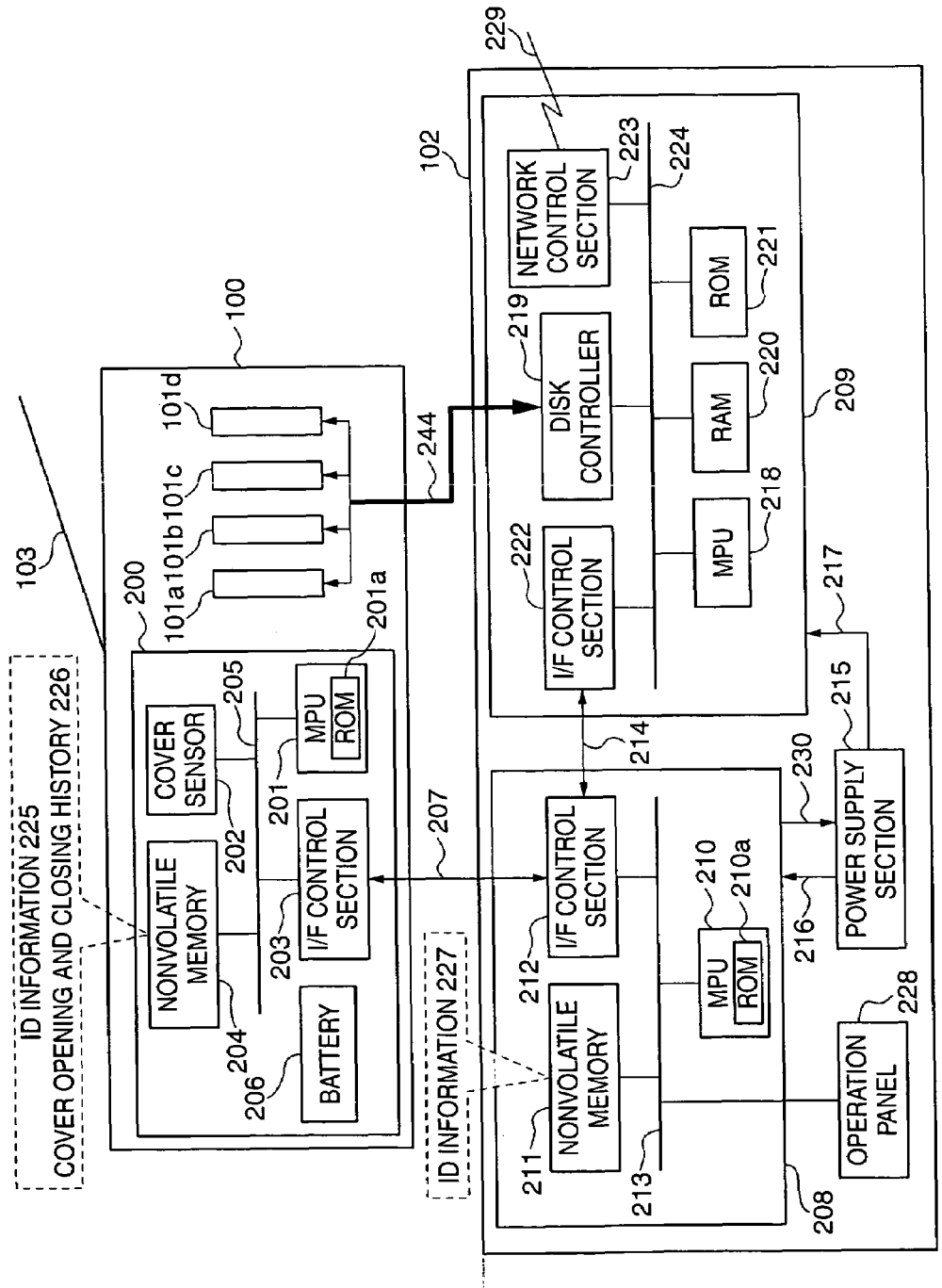
FIG. 2 is a block diagram schematically showing the arrangement of the information processing system according to the first embodiment.

FIG. 2 is a block diagram schematically showing the arrangement of the information processing system according to the present embodiment. The present information processing system is comprised of the hard disk devices 101a to 101d, the cartridge device 100 accommodating the hard disk devices 101a to 101d, and the information processing apparatus 102.

The cartridge device 100 includes the first control section 200. The first control section 200 is driven by a battery 206 and capable of carrying out predetermined processes in the off-line state. The first control section 200 is comprised of an MPU 201, a cover sensor 202, an interface controller 203, and a nonvolatile memory 204, all of which are interconnected by a bus 205.

The MPU 201 incorporates a ROM 201a and executes programs stored in the ROM 201a to control the first control section 200. The ROM 201a also stores a program for implementing predetermined processing steps of a flowchart shown in FIG. 3.

The cover sensor 202 detects the opening and closing of the cover 103. The cover sensor 202 is supplied with electric power from the battery 206, so that the opening and closing of the cover 103 can be detected even in the off-line state. The interface controller 203 exchanges various kinds of information with the information processing apparatus 102 via an interface line 207.

The nonvolatile memory 204 stores the history (cover opening and closing history 226) of the opening and closing of the cover 103, and ID information 225 for use in authentication by the information processing apparatus 102. The ID information 225 is acquired from a second control section 208, described hereinafter, of the information processing apparatus 102 via the interface line 207, and stored in the nonvolatile memory 204.

With the arrangement described above, the cartridge device 100 is capable of detecting the opening and closing of the cover 103 and storing information including the ID information 225 and the cover opening and closing history 226.

The information processing apparatus 102 is comprised of the second control section 208, a third control section 209, and a power supply section 215 that supplies electric power to the second control section 208 and the third control section 209.

How to start the information processing apparatus 102 will now be described.

First, when a power switch, not shown, is turned on, electric power is supplied to the second control section 208 via a power supply line 216, whereby the second control section 208 is activated. The second control section 208 activated by the power supply sends an instruction to the power supply section 215 via a control line 230 to cause the power supply section 215 to start power supply to the third control section 209 via a power supply line 217. When supplied with electric power, the third control section 209 loads an operating system and application programs from the hard disk devices 101a to 101d and executes these to thereby carry out various processes.

Next, a description will be given of the constructions of the second control section 208 and the third control section 209.

The second control section 208 is comprised of an MPU 210, an interface controller 212, and a nonvolatile memory 211, all of which are interconnected by a bus 213.

The MPU 210 incorporates a ROM 210a and executes programs stored in the ROM 210a to control the second control section 208. The ROM 210a also stores a program corresponding to the flowchart shown in FIG. 3.

The interface controller 212 exchanges various kinds of information with the third control section 209 via an interface line 214, as well as with the first control section 200 via the interface line 207.

The nonvolatile memory 211 stores information including ID information 227 for use in authentication of the cartridge device 100. The ID information 227 stored in the nonvolatile memory 211 may be information inputted by a predetermined administrator via an operation panel 228, or information managed by a management apparatus, not shown, on a network 229 and received from the management apparatus.

The ID information 227 (225) may be automatically generated by the second control section 208 or the third control section 209. In this case, after the cartridge device 100 is mounted and has its ID information authenticated, the ID information is changed to different ID information for use as the ID information 227 (225) thereafter. This makes it possible to further enhance security.

The ID information 227 stored in the nonvolatile memory 211 is sent to the first control section 200 by the interface controller 212 through operation of the operation panel 228 by the administrator. Upon reception of the ID information 227, the first control section 200 stores the same as the ID information 225 in the nonvolatile memory 204.

When the ID information 227 is automatically generated or changed by the second control section 208 or the third control section 209, it is desirable that the ID information 227 is automatically sent to the first control section 200 and stored in the nonvolatile memory 204, without operating the operation panel 228, so as to save the user's time and labor.

The operation panel 228 includes operating buttons, not shown, and a display, not shown. The operation panel 228 accepts operations by the operating buttons, and displays guide messages in response to the operations of the operating buttons.

Further, the second control section 208 has the function of detecting mounting of the cartridge device 100 in the information processing apparatus 102. This mounting detecting function is realized, for example, by configuring some signal lines of the interface line 207 such that they are connected to the ground from a normally open or disconnected state when the cartridge device 100 is mounted in the information processing apparatus 102, thereby detecting a change in the signal level of the signal lines.

The third control section 209 is comprised of an MPU 218, a disk controller 219, a RAM 220, a ROM 221, an interface control section 222, and a network control section 223, all of which are interconnected by a bus 224.

The MPU 218 loads programs stored in the ROM 221 into the RAM 220 and executes the same to control the third control section 209. The ROM 221 also stores a program for implementing predetermined processing steps of the flowchart shown in FIG. 3.

The interface control section 222 exchanges information with the second control section 208 via the interface line 214. The disk controller 219 performs RAID control of the disk array comprised of the hard disk devices 101a to 101d connected thereto via a disk interface 244 (serial ATA interface, for example).

Programs loaded from the hard disk devices 101a to 101d are also stored, as required, into the RAM 220, and executed by the MPU 218. The ROM 221 also stores a BIOS program to be initially executed by the MPU 218 after activation of the third control section 209. The BIOS program loads the operating system stored in the hard disk devices 101a to 101d into the RAM 220.

The network control section 223 controls data communication performed between the information processing apparatus 102 and external devices or apparatuses via the network 229.

The arrangement of the information processing apparatus 102 in which the control section thereof is divided into the second control section 208 and the third control section 209 is advantageous to a manufacturer who is supplied with the BIOS program from another manufacturer to manufacture the information processing apparatus 102 of the present invention but is incapable of modifying the BIOS program into a desired form.

Next, a process carried out by the information processing apparatus 102 in FIG. 1D to activate the third control section 209 using the second control section 208 will be described with reference to the flowchart in FIG. 3.

Figure 3:
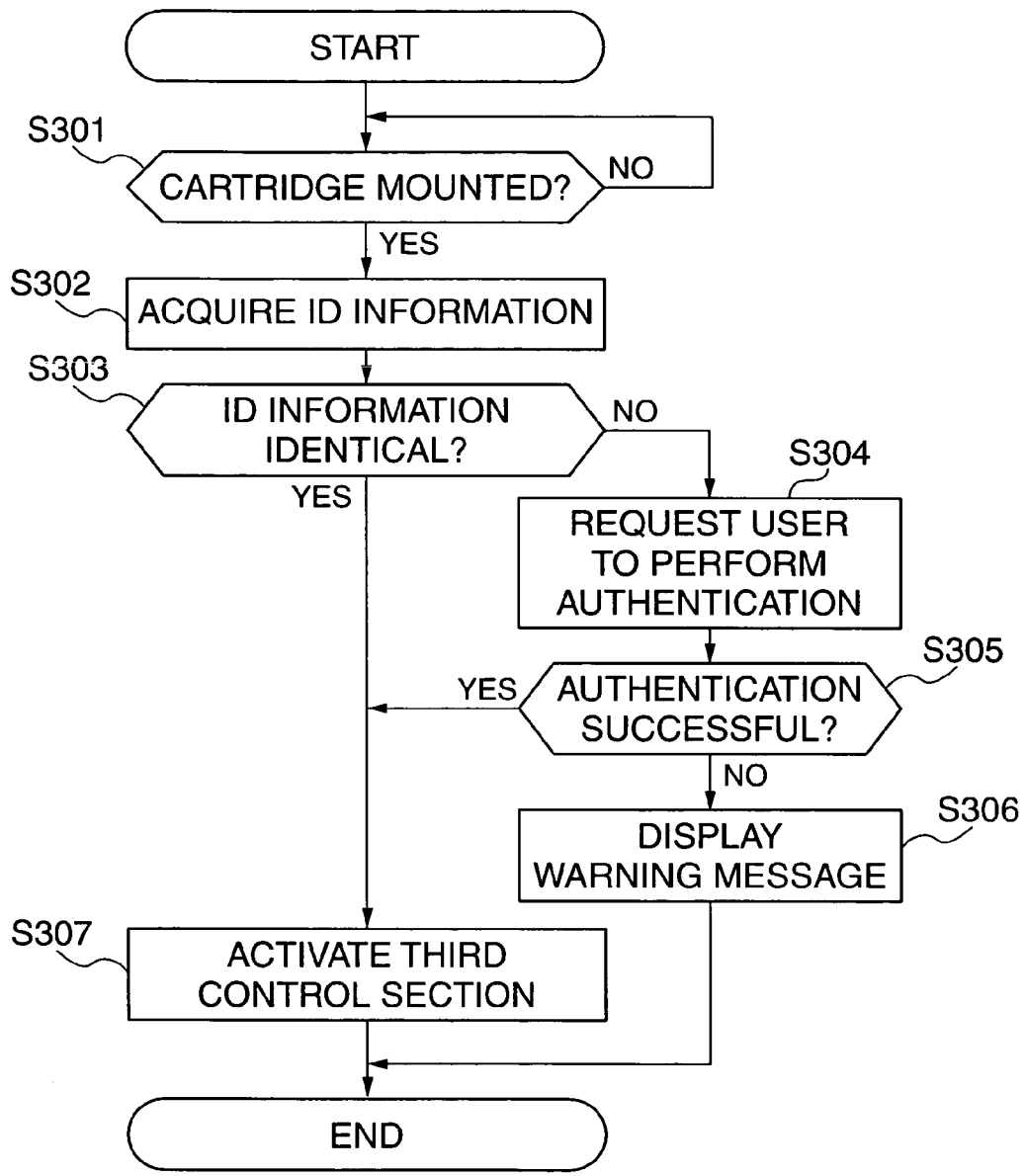
FIG. 3 is a flowchart showing a process carried out by the information processing apparatus.

As shown in FIG. 3, first, the MPU 210 of the second control section 208 determines, based on the aforementioned program stored in the ROM 210a, whether or not the cartridge device 100 is mounted in the information processing apparatus 102 (step S301). If the cartridge device 100 is mounted, the process proceeds to a step S302.

In the step S302, the interface controller 212 acquires the ID information 225 from the nonvolatile memory 204 of the first control section 200. In the following step S303, the ID information 225 acquired in the step S302 is checked against the ID information 227 stored in the information processing apparatus 102 (nonvolatile memory 211) to determine whether or not they are identical. If they are not identical, the process proceeds to a step S304.

In the step S304, the information processing apparatus 102 requests the user to perform an operation for authentication, and determines, based on authentication information entered via the operation panel 228, whether or not the user is authorized. The authentication information to be entered may be the ID information 227 or a password stored in advance in the nonvolatile memory 211.

In a step S305, it is determined whether or not the authentication has been successful in the step S304. If the authentication has been successful, the process proceeds to a step S307, wherein power supply to the third control section 209 is started to activate the same.

If the authentication has failed in the step S304, the process proceeds to a step S306, wherein a warning message indicating the fact is displayed on the display of the operation panel 228, followed by terminating the process.

If it is determined in the step S303 that the ID information 225 acquired in the step S302 is identical to the ID information 227 stored in the information processing apparatus 102, the process proceeds to the step S307, wherein power supply to the third control section 209 is started, as stated above, to activate the same.

When activated by the second control section 208, the third control section 209 immediately supplies electric power to the hard disk devices 101 to activate them and load the operating system stored in the hard disk devices 101 into the RAM 220.

As described above, according to the first embodiment, when the cartridge device 100 is used with a plurality of hard disk devices 101 as the disk array device accommodated therein, the cartridge device 100 is provided with the nonvolatile memory 204 from which the information processing apparatus 102 can acquire contents stored therein, and the nonvolatile memory 204 is caused to store the ID information 225 for authentication of a combination of the cartridge device 100 and the information processing apparatus 102. On the other hand, the information processing apparatus 102 acquires the ID information 225 from the nonvolatile memory 204 of the cartridge device 100 mounted therein, checks the ID information 225 against the ID information 227 stored in the information processing apparatus 102 itself, and determines, based on the result of the checking, whether or not the hard disk devices 101 are to be activated, i.e. whether or not a system program and the like are to be loaded.

The above-described operation makes it possible to authenticate the authorization of the disk array device quickly without activating the hard disk devices 101 within the cartridge device 100.

For example, even when a plurality of cartridge devices are mounted one by one into the information processing apparatus in order to find an authorized cartridge device therefrom, the checking can be carried out without activating hard disk devices whenever each cartridge device is mounted into the information processing apparatus, which make it possible to quickly find the authorized cartridge device.

Next, a second embodiment of the present invention, in which part of the first embodiment is improved, will be described mainly with respect to parts different from those of the first embodiment.

In the first embodiment, when the ID information 225 stored in the cartridge device 100 mounted in the information processing apparatus 102 is identical to the ID information 227 stored in the second control section 208, the third control section 209 (i.e. the hard disk devices 101) for realizing the main functions of the system is activated without requesting the user to perform an operation for authentication.

The second embodiment is distinguished from the first embodiment in that even if the ID information 225 stored in the cartridge device 100 mounted in the information processing apparatus 102 is identical to the ID information 227 stored in the second control section 208, when the cover 103 of the cartridge device 100 has the possibility of having been opened in the off-line state, user authentication is requested for activation of the third control section 209 (i.e. the hard disk devices 101).

Figure 4:
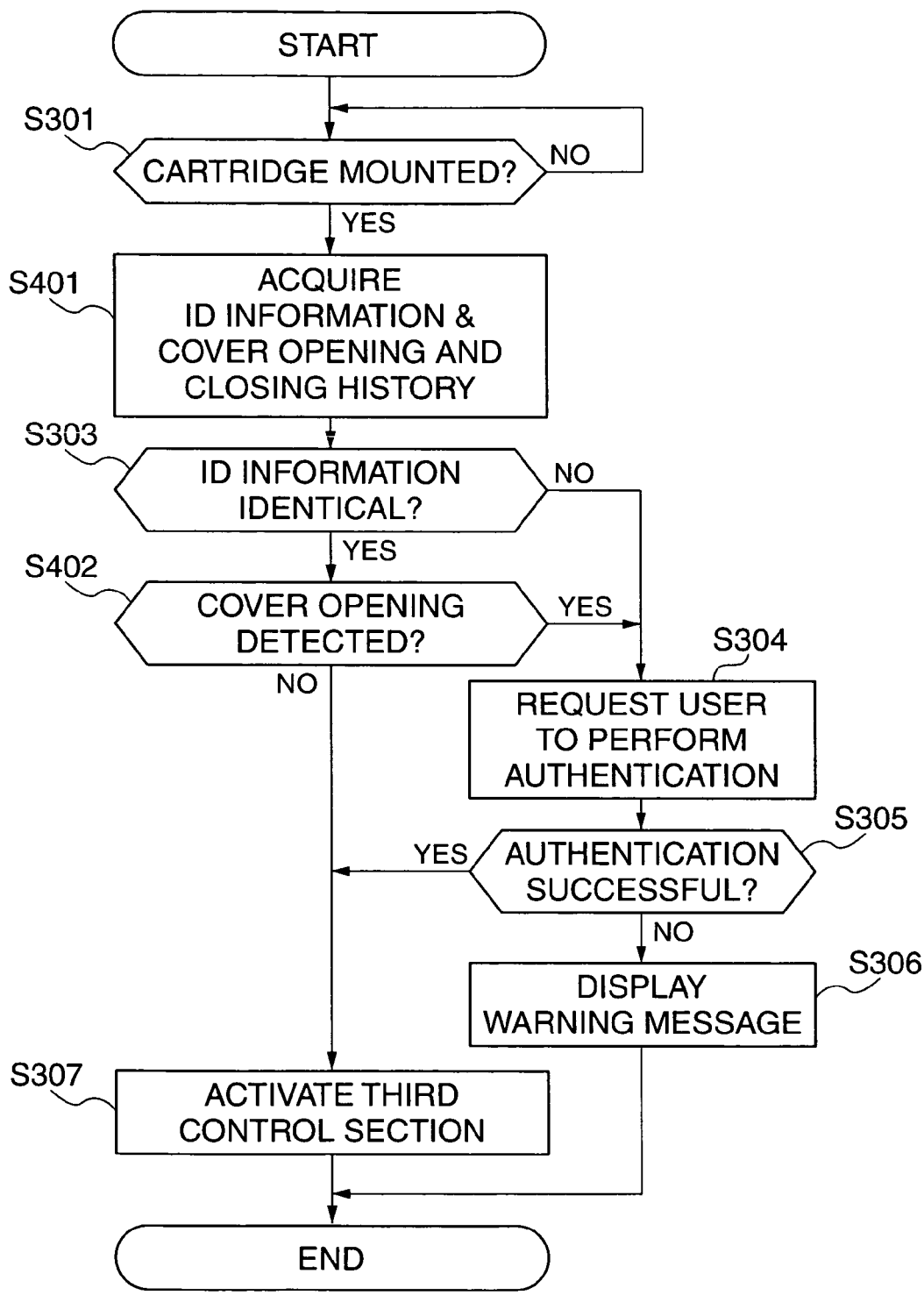
FIG. 4 is a flowchart showing a process carried out by an information processing apparatus according to a second embodiment of the present invention.
Figure 5A:
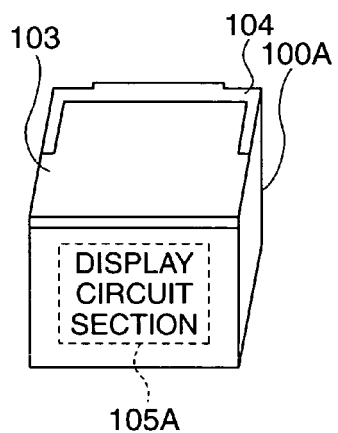
FIGS. 5A to 5F are perspective views showing the appearances of an array cartridge as a disk array device, an information processing apparatus, and a hard disk device, according to a third embodiment of the present invention.
Figure 5B:
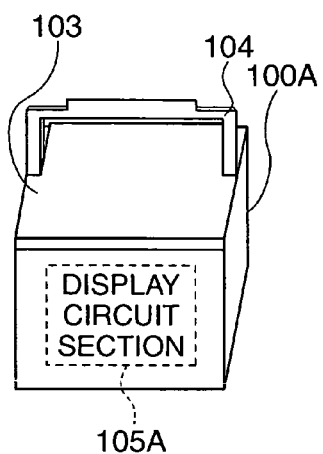
Figure 5C:
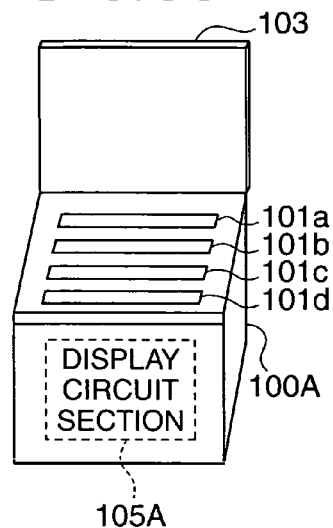
Figure 5D:
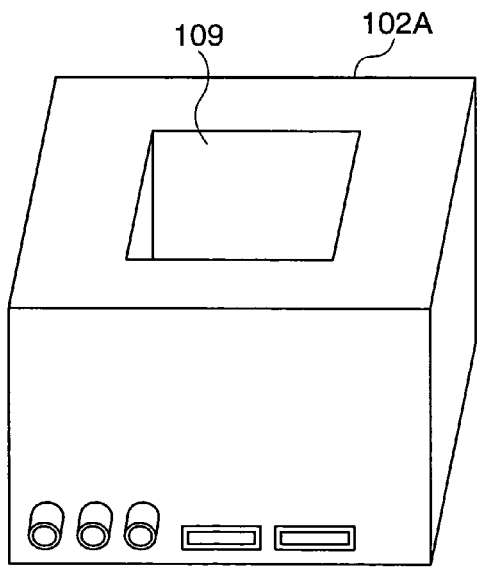
Figure 5E:
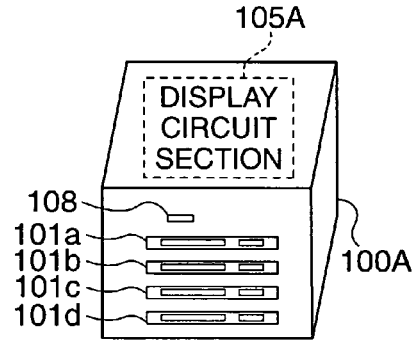
Figure 5F:
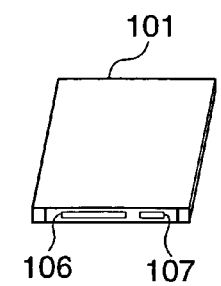

FIG. 4 is a flowchart showing a process carried out by the information processing apparatus 102 according to the second embodiment, for activating the third control section 209 using the second control section 208. Programs necessary for the cartridge device 100 and the information processing apparatus 102 to carry out the process, are stored in the ROM 201a of the cartridge device 100 and the ROM 221 of the information processing apparatus 102, as is the case with the first embodiment.

The flowchart in FIG. 4 is different from the flowchart in FIG. 3 in that the step S302 is replaced by a step S401, and that a step S402 is added, which is executed after an affirmative answer to the step S303 is obtained. Therefore, in the following description, only the steps S401 and S402 will be described, and description of the other steps is omitted.

First, in the step S401, not only the ID information 225 but also the cover opening and closing history 226 is acquired from the first control section 200.

In the step S402, it is determined, based on the cover opening and closing history 226 acquired in the step S401, whether or not the cover 103 of the cartridge device 100 was opened in the off-line state. If the cover 103 was opened in the off-line state, the process proceeds to the step S304, wherein the user is requested to carry out an operation for authentication.

If it is determined that the cover 103 of the cartridge device 100 was not opened in the off-line state, the process proceeds to the step S307, wherein power supply to the third control section 209 is started to activate the same.

As described above, according to the second embodiment, even if the ID information 225 and the ID information 227 are identical with each other, when there is a sign of the cover 103 having been opened in the off-line state, it is judged that the hard disk devices 101 contained in the cartridge device 100 have the possibility of having been unauthorizedly used, and the user is requested to carry out an operation for authentication. This makes it possible to more reliably prevent the information processing apparatus 102 from being operated in a state having unauthorized programs and data loaded therein.

Further, since the determination as to the possibility of the hard disk devices 101 having been used without authorization is made based on the history of the opening and closing of the cover 103 detected by the cover sensor 202, it is possible to make the determination without making the construction of the cartridge device 100 complicated.

Next, a description will be given of a third embodiment of the present invention.

FIGS. 5A to 5F are perspective views showing the appearances of a disk array cartridge (hereinafter referred to as "the array cartridge") 101A to which is applied the RAID method, as the disk array device according to the third embodiment, an information processing apparatus (hereinafter referred to as "the main unit") 102A that accommodates and uses the array cartridge 100A, and a hard disk device 101 contained in the array cartridge 100A. It should be noted that component parts identical to those of the first embodiment (FIGS. 1A to 1F) are designated by identical reference numerals, and description thereof is omitted.

As shown in FIGS. 5A to 5F, the array cartridge 100A has a cover 103 mounted on the upper surface of a casing thereof, for being closed to cover receiving slots via which hard disk devices 101 are received, respectively, a handle 104 foldably attached to the upper surface of the casing, a display circuit section 105A provided on a side of the casing, for performing various operations, described hereinafter, and a connector 108 disposed on the lower surface of the casing. The array cartridge 100A is removably mounted in the main unit 102A.

The connector 108 of the array cartridge 100A is for connecting between the display circuit section 105A of the array cartridge 100A and the main unit 102A. In the present embodiment, the connector 108 is comprised of a serial interface signal line and a power supply line. The hard disk device 101 received in the array cartridge 100A has the communication connector 106 and the power connector 107 thereof connected, respectively, to the connector 108 of the array cartridge 100A and a connector, not shown, provided in a deep portion of the main unit 102A located below an insertion port 109 shown in FIG. 5D.

The main unit 102A is an apparatus into which the array cartridge 100A is removably mounted as mentioned above, and carries out processing including supply of electric power to the hard disk devices 101 received in the array cartridge 100A and the display circuit section 105A of the array cartridge 100A, transmission of information to the display circuit section 105A, and writing and reading of data in and from the hard disk devices 101. The main unit 102A can be implemented by any suitable one of various information processing apparatuses, such as computers and electronic database units.

Although in FIGS. 5A to 5C, and 5E, the display circuit section 105A is disposed on the side of the casing of the array cartridge 100A, the display circuit section 105A may be disposed on the upper surface of the cover 103 of the array cartridge 100A.

Figure 6:
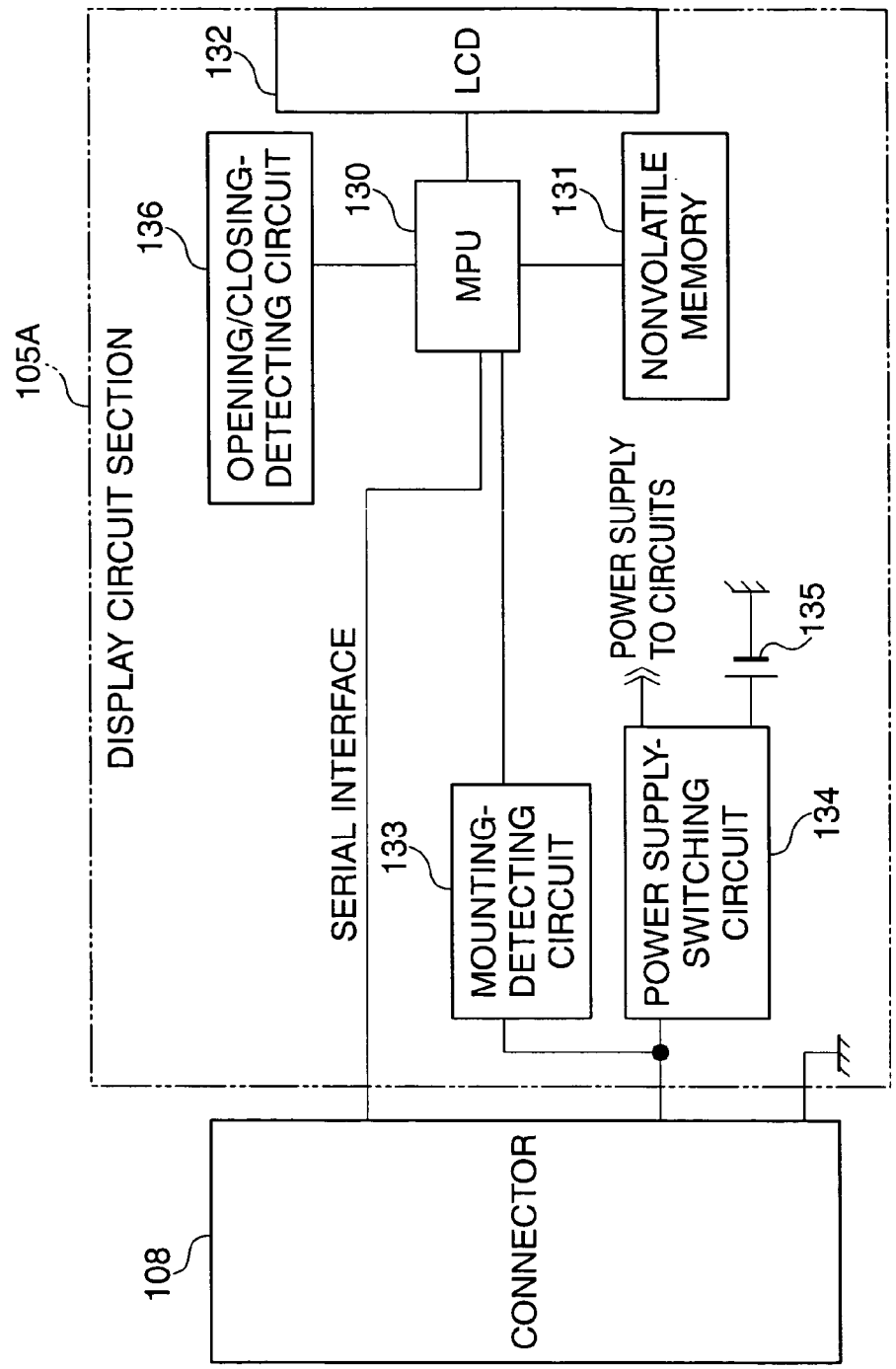
FIG. 6 is a block diagram showing the arrangement of a display circuit section of the array cartridge in FIGS. 5A to 5c, and 5E.

FIG. 6 is a block diagram showing the arrangement of the display circuit section 105A of the array cartridge 100A.

As shown in FIG. 6, the display circuit section 105A is comprised of an MPU 130, a nonvolatile memory 131, a liquid crystal display device (LCD) 132, a mounting-detecting circuit 133, a power supply-switching circuit 134, a lithium battery 135, and an opening/closing-detecting circuit 136.

The MPU 130 is a central processing unit that controls the overall operation of the display circuit section 105A. The MPU 130 executes processes shown in flowcharts described hereinafter in detail with reference to FIGS. 10 to 12, based on programs stored in a ROM. The MPU 130 is implemented by one chip in which are integrated a CPU, the ROM, a RAM, I/O ports, a serial interface port, and so forth. The serial interface port of the MPU 130 is connected, via the connector 108, to the main unit 102A which uses the array cartridge 100A mounted therein.

The nonvolatile memory 131 is implemented by an EEPROM, a flash memory, an SRAM backed up by a battery, or the like. In the present embodiment, the nonvolatile memory 131 stores identification information (first information, referred to hereinafter) for the array cartridge 100A (the entire array structure comprised of the hard disk devices 101). The nonvolatile memory 131 stores information transmitted to the MPU 130 from the main unit 102A via the serial interface, as will be described in detail hereinafter with reference to the flowchart in FIG. 10. Further, the nonvolatile memory 131 has a predetermined area in which is stored an opening/closing-storing flag for storing information of results of detection of an open or closed state of the cover 103 of the array cartridge 100A by the opening/closing-detecting circuit 136.

The LCD 132 is disposed on a side of the casing of the array cartridge 100A with a display screen thereof exposed. The LCD 132 is adapted to display desired character information or the like based on output signals from the MPU 130. The mounting-detecting circuit 133 detects whether or not the array cartridge 100A is mounted in the main unit 102A. The lithium battery 135 supplies electric power to the above-mentioned parts of the display circuit section 105A. The power supply-switching circuit 134 switches between power supply from the main unit 102A to the display circuit section 105A via the connector 108 and power supply from the lithium battery 135 to the display circuit section 105A. The opening/closing-detecting circuit 136 detects the opening and closing of the cover 103 provided for covering the receiving slots formed in the array cartridge 100A for receiving the hard disk devices 101 therein.

When the array cartridge 100A is mounted in the main unit 102A, electric power is supplied from the main unit 102A to the display circuit section 105A via the connector 108. In a state where the array cartridge 100A is not mounted in the main unit 102A, the entire display circuit section 105A is operated with the lithium battery 135 as the power source, whereas in a state where the array cartridge 100A is mounted in the main unit 102A, the display circuit section 105A is operated by electric power supplied from the main unit 102A via the connector 108. The power supply-switching circuit 134 switches the one power supply to another.

The basic operation of the display circuit section 105A is comprised of displaying (including stoppage of displaying) information stored in the nonvolatile memory 131 or the ROM of the MPU 130 on the LCD 132, based on the result of detection by the mounting-detecting circuit 133 as to whether the array cartridge 100A is mounted in the main unit 102A, and the result of detection by the opening/closing-detecting circuit 136 as to whether the cover 103 was opened. The operation will be described in detail hereinafter with reference to the flowcharts in FIGS. 10 to 12.

Figure 7:
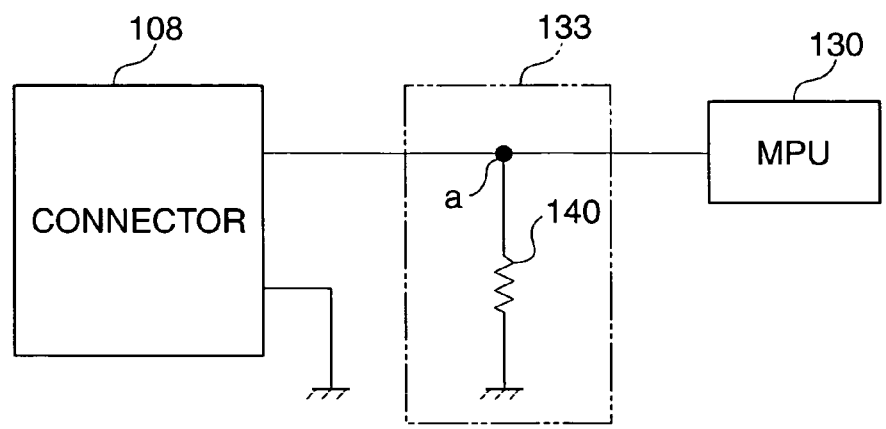
FIG. 7 is a block diagram showing details of the construction of a mounting-detecting circuit of the display circuit section appearing in FIG. 6.

FIG. 7 is a block diagram showing details of the construction of the mounting-detecting circuit 133 of the display circuit section 105A.

As shown in FIG. 7, the mounting-detecting circuit 133 includes a pull-down resistor 140. A line via which electric power is supplied from the main unit 102A to the display circuit section 105A via the connector 108 is connected to an input port of the MPU 130 via the pull-down resistor 140. When the array cartridge 100A is not mounted in the main unit 102A, the signal level at a point "a" in FIG. 7 is low, whereas when the array cartridge 100A is mounted in the main unit 102A, the signal level at the point "a" is high. Therefore, based on the state (high or low) of the signal level at the input port of the MPU 130, it is possible to detect whether or not the array cartridge 100A is mounted in the main unit 102A.

Figure 8:
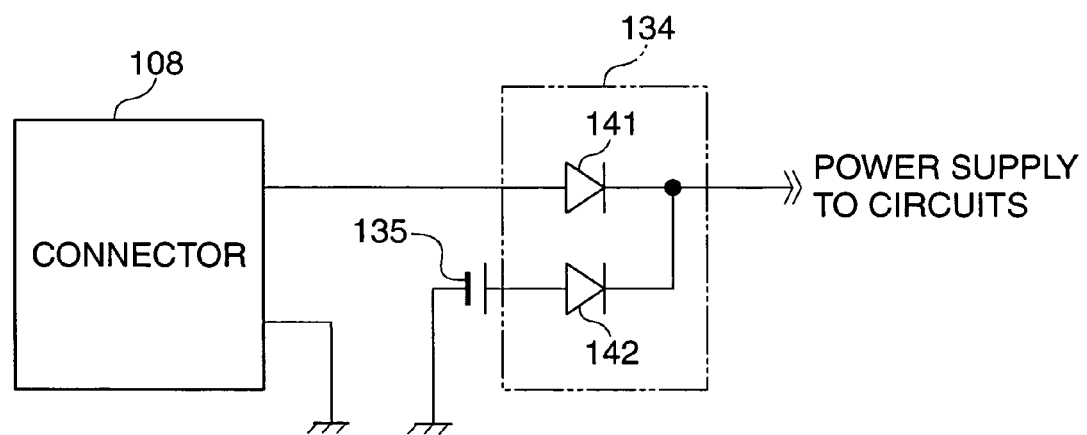
FIG. 8 is a block diagram showing details of the construction of a power supply-switching circuit of the display circuit section.

FIG. 8 is a block diagram showing details of the construction of the power supply-switching circuit 134 of the display circuit section 105A.

As shown in FIG. 8, the power supply-switching circuit 134 includes Schottky barrier diodes 141 and 142. A line via which electric power is supplied from the main unit 102A to the display circuit section 105A via the connector 108 and a line via which electric power is supplied from the lithium battery 135 are connected via the respective Schottky barrier diodes 141 and 142 to the circuits of the display circuit section 105A. The power supply voltage of the electric power supplied from the main unit 102A to the display circuit section 105A via the connector 108 is 5V, and the voltage of the lithium battery 135 is 3V. Through rectifications by the respective Schottky barrier diodes 141 and 142, when the array cartridge 100A is mounted in the main unit 102A, the electric power (5V) from the connector 108 is selected as the power supply to the display circuit section 105A, and when the array cartridge 100A is not mounted in the main unit 102A, the lithium battery 135 (3V) is selected as the same.

In other words, the Schottky barrier diodes 141 and 142 form the power supply-switching circuit 134 for switching between the power supply from the main unit 102A via the connector 108 and the power supply from the lithium battery 135. Taking into consideration the forward voltage drops of the Schottky barrier diodes 141 and 142, it is estimated that a voltage of approximately 4.8 V or 2.8 V is eventually outputted as the power supply voltage to the display circuit section 105A. In this case, IC's, LSI's and so forth forming the display circuit section 105A are implemented by CMOS's or the like, and therefore the display circuit section 105A can be operated by either of the voltages without any problem. Of course, the power supply-switching circuit 134 may be implemented not by Schottky barrier diodes, but by switching elements, such as FET'S.

Figure 9:
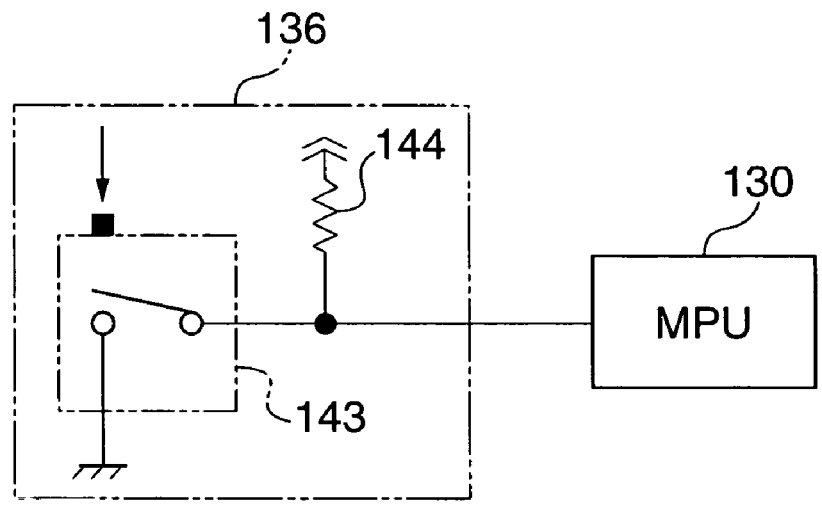
FIG. 9 is a block diagram showing details of the construction of an opening/closing-detecting circuit of the display circuit section.

FIG. 9 is a block diagram showing details of the construction of the opening/closing-detecting circuit 136 of the display circuit section 105A.

As shown in FIG. 9, the opening/closing-detecting circuit 136 includes a microswitch 143 and a pull-up resistor 144. The microswitch 143 operates in response to an operation of opening and closing the cover 103 of the array cartridge 100A by the user. The microswitch 143 has one terminal thereof grounded and the other terminal thereof pulled up by the pull-up resistor 144 and connected to the input port of the MPU 130. Since the microswitch 143 is "opened and closed" in response to the opening and closing of the cover 103, the opening and closing of the cover 103 can be detected based on the signal level at the input port of the MPU 130. The opening/closing-detecting circuit 136 may be implemented not by a mechanical microswitch, but by a sensor element, such as a photointerrupter.

Next, processes carried out by the array cartridge 100A of the present embodiment constructed as above will be described with reference to the flowcharts shown in FIGS. 10 to 12.

Figure 10:
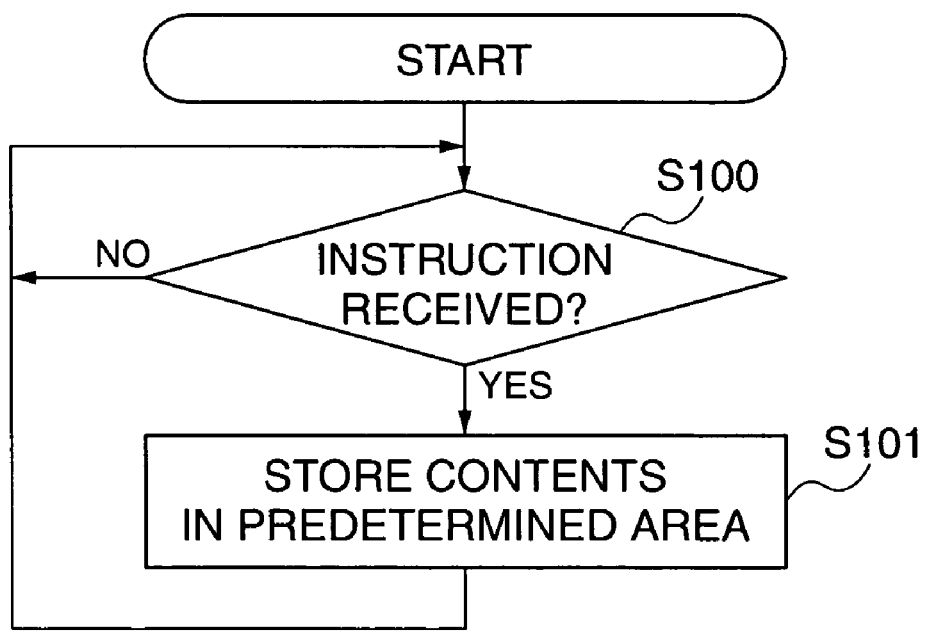
FIG. 10 is a flowchart showing a process for writing information into a nonvolatile memory of the display circuit section.

FIG. 10 is a flowchart showing a process carried out by the array cartridge 100A for writing information in the nonvolatile memory 131 of the display circuit section 105A thereof.

As shown in FIG. 10, first, the MPU 130 of the array cartridge 100A determines whether or not a write instruction has been received from the main unit 102A via the serial interface (step S100). If the write instruction has been received (YES to the step S100), the MPU stores contents (identification information as the first information, referred to hereinafter) based on the write instruction in a predetermined area of the nonvolatile memory 131 (step S101). Thereafter, the steps S100 and S101 are repeatedly executed.

This means that the main unit 102A can update (rewrite) information (at least part of the information) stored in the nonvolatile memory 131 of the array cartridge 100A, at any time required, via the connector 108 of the array cartridge 100A and the serial interface of the MPU 130 of the display circuit section 105A. It goes without saying that the process shown in the flowchart in FIG. 10 is carried out only when the array cartridge 100A is mounted in the main unit 102A.

Figure 11:
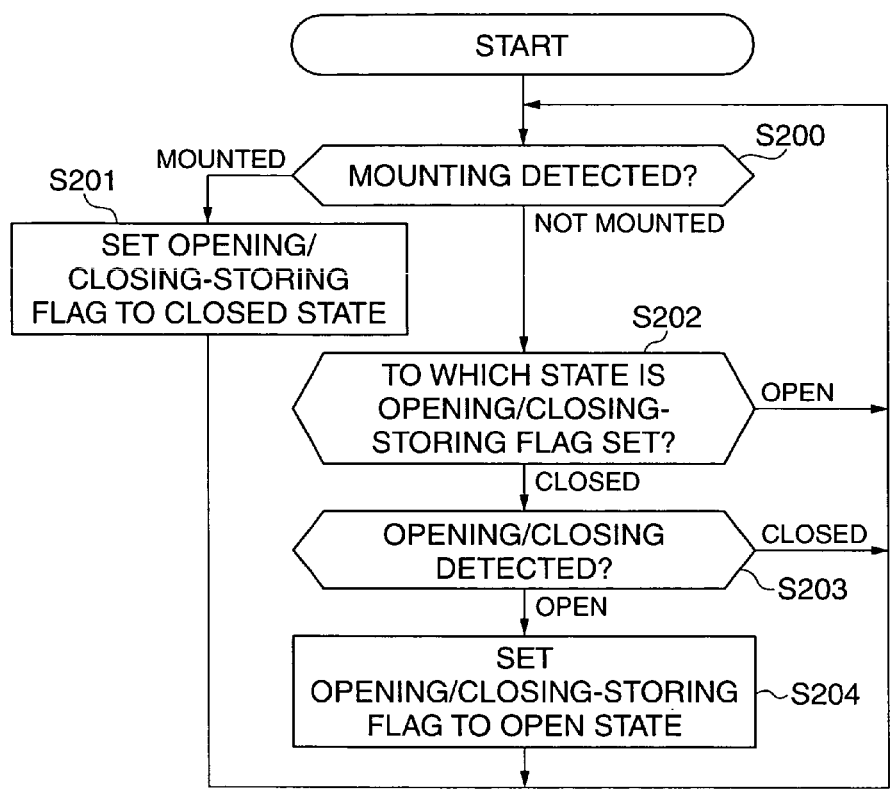
FIG. 11 is a flowchart showing a process carried out in association with detection of opening or closing of a cover of the array cartridge in FIGS. 5A to 5c, and 5E.

FIG. 11 is a flowchart showing a process carried out by the array cartridge 100A in association with detection of the opening/closing of the cover 103 thereof.

As shown in FIG. 11, first, the MPU 130 of the array cartridge 100A determines, based on an output signal from the mounting-detecting circuit 133, whether or not the array cartridge 100A is mounted in the main unit 102A (step S200). If the array cartridge 100A is mounted in the main unit 102A ("Mounted" in the step S200), the MPU 130 sets the opening/closing-storing flag stored in the predetermined area of the nonvolatile memory 131 to an "Closed" state (=0) (stores the set flag; step S201). On the other hand, if the array cartridge 100A is not mounted in the main unit 102A ("Not Mounted" in the step S200), the MPU determines whether the opening/closing-storing flag has been set to the "Open" state or the "Closed" state (step S202).

If the opening/closing-storing flag has been set to the "Open" state ("Open" in the step S202), the MPU 130 returns to the step S200 without carrying out any processing.

On the other hand, if the opening/closing-storing flag has been set to the "Closed" state ("Closed" in the step S202), the MPU 130 determines, based on an output signal from the opening/closing-detecting circuit 136, whether or not the cover 103 is open (step S203). If the opening/closing-detecting circuit 136 detects that the cover 103 is "Closed" ("Closed" in the step S203), the MPU 130 returns to the step S200 without carrying out any processing, whereas if the opening/closing-detecting circuit 136 detects that the cover 103 is "Open" ("Open" in the step S203), the MPU sets the opening/closing-storing flag to the "Open" state (=1) (stores the set flag; step S204).

Through execution of the above-described process, once the cover 103 of the array cartridge 100A is opened when the array cartridge 100A is not mounted in the main unit 102A, the opening/closing-storing flag is held in the "Open" state thereafter. The "Open" state of the opening/closing-storing flag is cleared, i.e. the opening/closing-storing flag is reset to the "Closed" state by mounting the array cartridge 100A in the main unit 102A.

Figure 12:
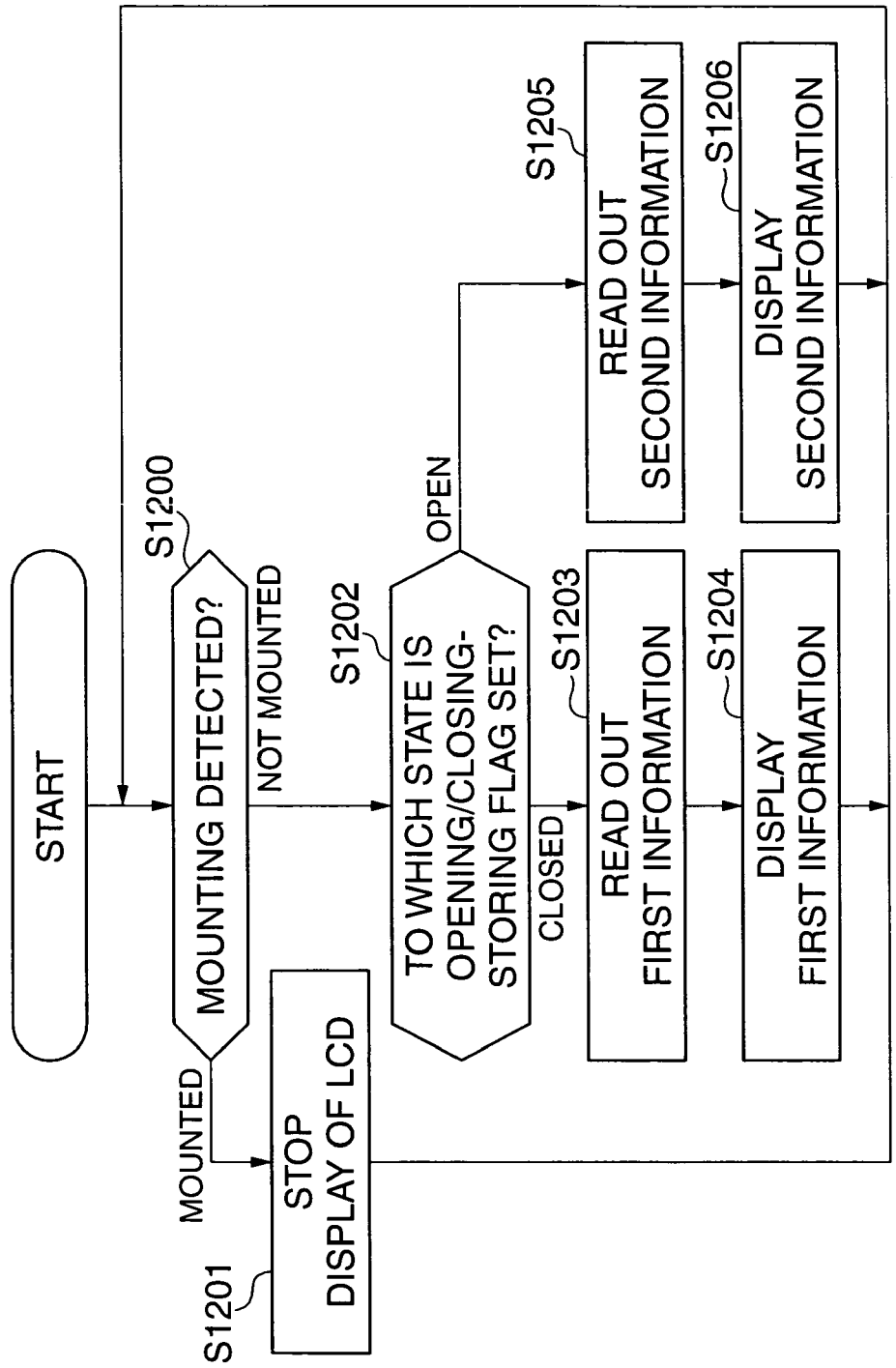
FIG. 12 is a flowchart showing a display process carried out by the display circuit section, for display on an LCD.

FIG. 12 is a flowchart showing a display process carried out by the display circuit section 105A of the array cartridge 100A for displaying on the LCD 132.

As shown in FIG. 12, first, the MPU 130 of the array cartridge 100A determines whether or not the array cartridge 100A is mounted in the main unit 102A (step S1200). If the array cartridge 100A is mounted in the main unit 102A ("Mounted" in the step S1200), the MPU 130 stops displaying on the LCD 132 (step S1201), and returns to the step S1200. On the other hand, if the array cartridge 100A is not mounted in the main unit 102A ("Not Mounted" in the step S1200), the MPU 130 makes the determination as to the value of the opening/closing-storing flag, described hereinabove with reference to FIG. 11 (step S1202).

If the opening/closing-storing flag has been set to the "Closed" state (=0) ("Closed" in the step S1202), the MPU 130 reads out the information (first information), described hereinabove with reference to FIG. 6, from the nonvolatile memory 131 (step S1203), and displays the first information on the LCD 132 (step S1204). Thereafter, the steps S1200, and S1202 to S1204 are repeatedly executed. On the other hand, if the opening/closing-storing flag has been set to the "Open" state (=1) ("Open" in the step S1202), the MPU 130 reads out second information stored in advance in the ROM of the MPU 130 (step S1205), and displays the second information on the LCD 132 (step S1206). Thereafter, the steps S1200, S1202, S1205, and S1206 are repeatedly executed.

Now, let it be assumed that the information stored in the nonvolatile memory 131, i.e. the first information is identification information indicative of a title label, a volume name, and an ID number associated with the array cartridge 100A, and the second information stored in advance in the ROM of the MPU 130 is indicative of a character string, such as "Cover was opened". Normally, the identification information, such as the title label, the volume name, and the ID number, is displayed on the LCD 132, and once the cover 103 is opened when the array cartridge 100A is not mounted in the main unit 102A, the message "Cover was opened" or the like information is displayed on the LCD 132. When the array cartridge 100A is mounted in the main unit 102A, nothing is displayed on the LCD 132.

In short, by displaying on the LCD 132 as described above, normally the user can check the identification information of an array cartridge 100A removed from the main unit 102A, and should the cover 103 be opened when the array cartridge 100A is not mounted in the main unit 102A, the user can recognize the possibility of the array cartridge 100A having been tampered.

The array cartridge 100A may add identification information of a main unit 102A in which the array cartridge 100A has been mounted so far to the first information, to thereby display the identification information of the main unit 102A on the LCD 132. Since the array cartridge 100A can be mounted in any of a plurality of main units having the same construction, the display of the identification information of the main unit 102A enables the user to identify the main unit 102A where the array cartridge 100A has been mounted so far.

Further, although in the flowchart in FIG. 12, when the array cartridge 100A is mounted in the main unit 102A, displaying on the LCD 132 is stopped in the step S1201, the step S1201 may be omitted when the display circuit section 105A is disposed on the upper surface of the cover 103, so as to allow display to be continued as in the case where the array cartridge 100A is not mounted in the main unit 102A.

Although in the above-described embodiment, the first information is stored in the nonvolatile memory 131, and the second information is stored in the ROM of the MPU 130, both the first and second information may be stored in the nonvolatile memory 131. In this case, however, it is desirable to configure such that the second information cannot be freely rewritten by a user. Further, the second information may be displayed on the LCD 132 not separately but in a manner added to the first information.

As described above, according to the present embodiment, the array cartridge 100A accommodating a plurality of hard disk devices is provided with a single display device (LCD 132) for the entire array structure, but not for each of the hard disk devices, and the identification information (the title label, the volume name, the ID number, etc.) for identifying the entire array structure is displayed on the LCD 132. Therefore, as is distinct from the prior art where a display device is provided for each hard disk device, it is possible to eliminate the redundancy of displaying the same contents on each of a plurality of display devices, as well as to reduce the number of component parts and manufacturing costs.

Further, the LCD 132 of the array cartridge 100A not only displays the identification information, but also displays a message (e.g. "Cover was opened") when the cover 103 of the array cartridge 100A is opened when the array cartridge 100A is not mounted in the main unit 102A. This enables the user to recognize the possibility of the array cartridge 100A having been subjected to some kind of tampering.

Next, a description will be given of a fourth embodiment of the present invention.

In the third embodiment described above, no special locking means is provided for the cover 103 of the array cartridge 100A. However, if the cover 103 can be locked by a suitable locking means when the array cartridge 100A is not mounted in the main unit, tampering or the like of the hard disk devices within the array cartridge 100A will be effectively prevented. To this end, in the present embodiment, there is provided a locking means for permitting or inhibiting the opening of the cover 103 of the array cartridge 100A, so as to control locking and unlocking of the cover 103.

Figure 13:
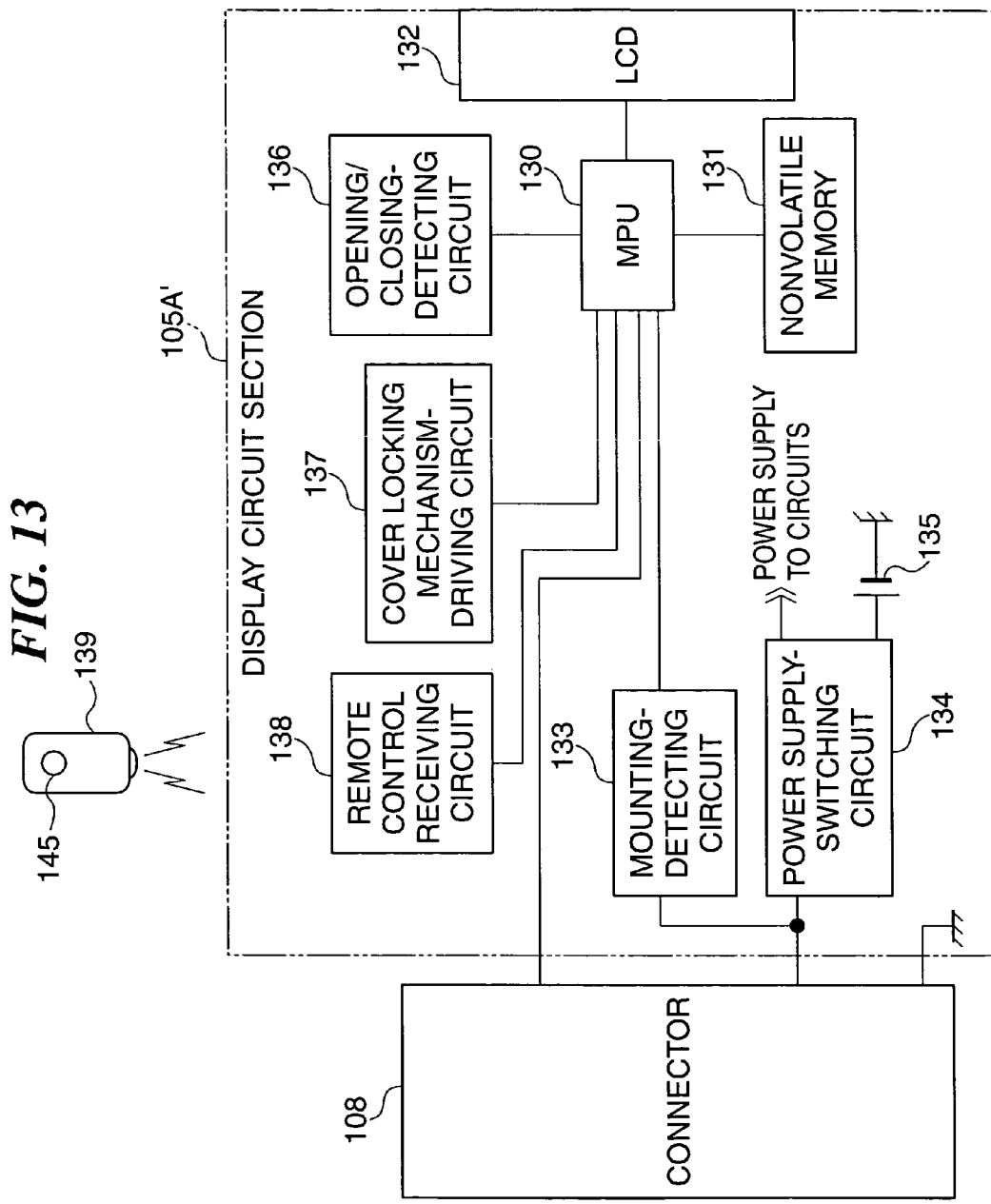
FIG. 13 is a block diagram showing the arrangement of an array cartridge as a disk array device according to a fourth embodiment of the present invention.

FIG. 13 is a block diagram showing the arrangement of a display circuit section 105A' of the array cartridge 100A according to the fourth embodiment.

As shown in FIG. 13, the display circuit section 105A' is comprised of an MPU 130, a nonvolatile memory 131, an LCD 132, a mounting-detecting circuit 133, a power supply-switching circuit 134, a lithium battery 135, an opening/closing-detecting circuit 136, a cover locking mechanism-driving circuit 137, and a remote control receiving circuit 138. In FIG. 13, reference numeral 139 designates an infrared remote control unit used as an accessory to the array cartridge 100A.

The display circuit section 105A' is further comprised of the cover locking mechanism-driving circuit 137 and the remote control receiving circuit 138, compared with the display circuit section 105A, described hereinbefore with reference to FIG. 6. The cover 103 of the array cartridge 100A is formed with a claw (not shown) as a locking means. This claw is held in a cover-locking position by an actuator, not shown, driven by a motor, not shown, whereby unauthorized opening of the cover 103 is prevented.

The cover locking mechanism-driving circuit 137 includes a driver element for driving the above-mentioned motor and a position sensor element, neither of which is shown, and is capable of locking or unlocking the cover 103, in response to an instruction from the MPU 130. The remote control receiving circuit 138 receives a signal transmitted from the infrared remote control unit 139 outside the array cartridge 100A, which is operated by a user.

The infrared remote control unit 139 includes a button switch 145, and transmits a signal instructing unlocking of the cover 103 to the display circuit section 105A' by infrared communication, in response to depression of the button switch 145 by the user. The infrared remote control unit 139 is configured such that it transmits a signal code unique thereto to an array cartridge 100A associated therewith, so that the unlocking instruction cannot be given to the display circuit section 105A' of the array cartridge 100A, by using another infrared remote control unit having a different signal code from the proper one which is factory-set before shipment, for example. In short, the infrared remote control unit 139 plays the role of a "key" for unlocking the cover 103 of the array cartridge 100A.

The MPU 130 is a central processing unit that controls the overall operation of the display circuit section 105A'. The MPU 130 executes processes shown in flowcharts, described in detail hereinafter, with reference to FIGS. 14 to 16, based on programs stored in a ROM thereof. Component parts identical to those of the third embodiment (FIG. 6) (the nonvolatile memory 131, the LCD 132, the mounting-detecting circuit 133, the power supply-switching circuit 134, the lithium battery 135, and the opening/closing-detecting circuit 136) are designated by identical reference numerals, and description thereof is omitted.

Next, processes carried out by the array cartridge 100A of the present embodiment constructed as above will be described with reference to the flowcharts shown in FIGS. 14 to 16.

Figure 14:
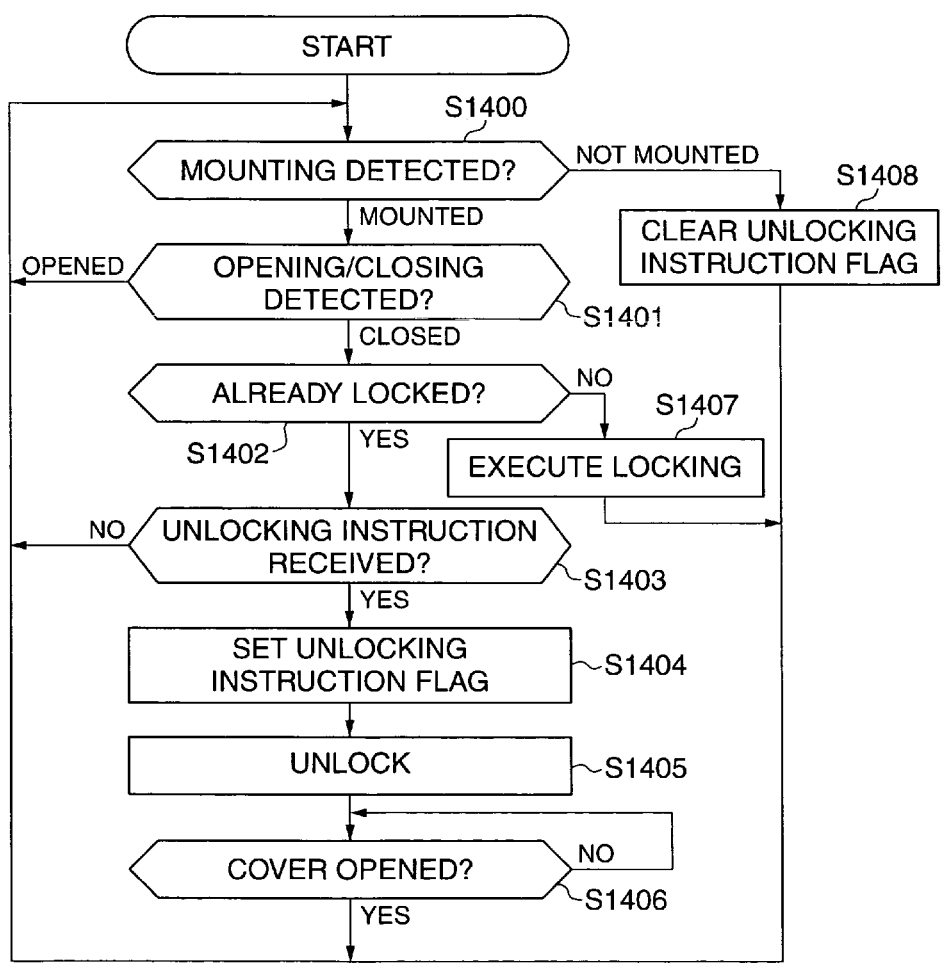
FIG. 14 is a flowchart showing a process carried out in association with locking or unlocking of a cover of the array cartridge, by a display circuit section appearing in FIG. 13.

FIG. 14 is a flowchart showing a process carried out by the array cartridge 100A in association with the locking or unlocking of the cover 103.

As shown in FIG. 14, first, the MPU 130 of the array cartridge 100A determines whether or not the array cartridge 100A is mounted in the main unit 102A (step S1400). If the array cartridge 100A is mounted in the main unit 102A ("Mounted" in the step S1400), the MPU 130 determines whether the opening/closing-detecting circuit 136 has detected that the cover 103 of the array cartridge 100A was opened (step S1401). If it has been detected by the opening/closing-detecting circuit 136 that the cover 103 was opened ("Opened" in the step S1401), the MPU returns to the step S1400 without carrying out any processing. On the other hand, if it has been detected by the opening/closing-detecting circuit 136 that the cover 103 remained closed ("Closed" in the step S1401), the MPU 130 determines whether or not the cover 103 has already been locked (step S1402).

If the cover 103 has already been locked (YES to the step S1402), the MPU 130 waits for the remote control receiving circuit 138 to receive the signal instructing unlocking of the cover 103 from the infrared remote control unit 139, and determines whether or not the unlocking instruction signal has been received from the infrared remote control unit 139 (step S1403). If the unlocking instruction signal has been received (YES to the step S1403), the MPU 130 sets an unlocking instruction flag stored in a predetermined area of the nonvolatile memory 131 (to "1") (step S1404), and then controls the cover locking mechanism-driving circuit 137 to execute unlocking (step S1405). Then, the MPU 130 determines whether or not the cover 103 has been opened (step S1406). If the cover 103 has been opened (YES to step S1406), the MPU returns to the step S1400.

On the other hand, if the cover has not been locked yet (NO to the step S1402), the MPU 130 controls the cover locking mechanism-driving circuit 137 to execute locking (step S1407), followed by the process returning to the step S1400. If the array cartridge 100A is not mounted in the main unit 102A in the step S1400 ("Not Mounted" in the step S1400), the MPU 130 clears the unlocking instruction flag stored in the predetermined area of the nonvolatile memory 131 (to "0") (step S1408), followed by the process returning to the step S1400.

Through execution of the above-described process, when the cover 103 of the array cartridge 100A is closed, the locking of the cover 103 is automatically carried out (so-called automatic locking), and once the cover 103 is locked, it can be unlocked only by the unlocking instruction from the infrared remote control unit 139. To lock the unlocked cover 103 again, the user has only to close the cover 103 after opening the same. Further, the unlocking instruction flag can be cleared by mounting the array cartridge 100A in the main unit 102A again.

Figure 15:
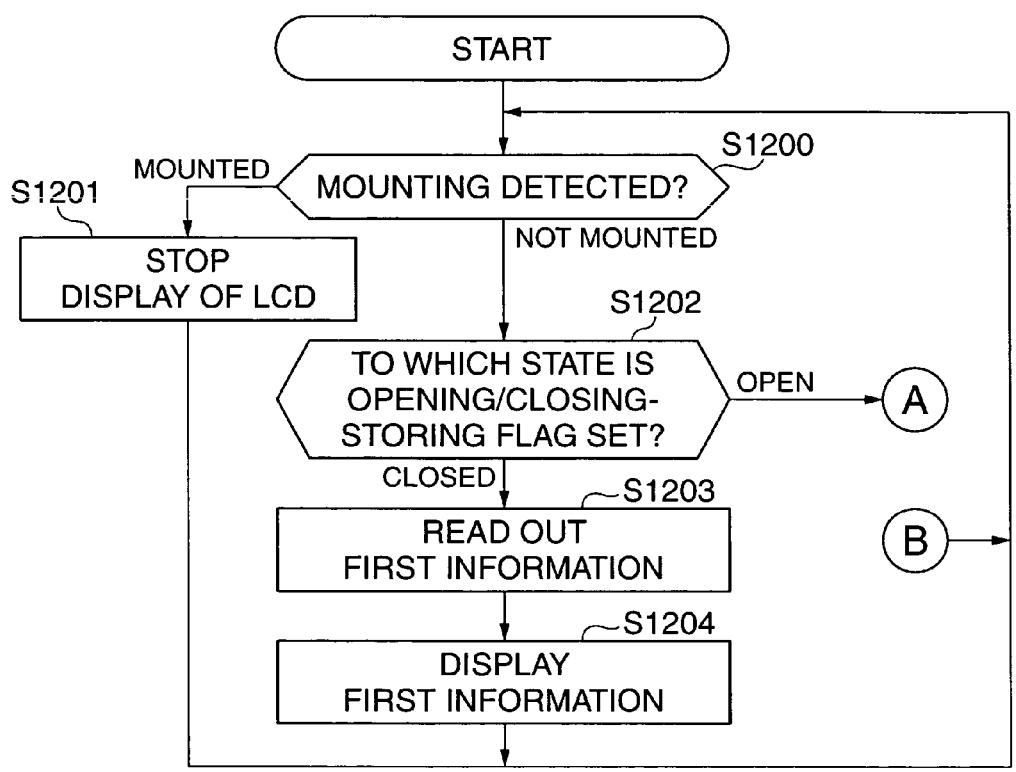
FIG. 15 is a flowchart showing a display process carried out by the display circuit section appearing in FIG. 13, for display on an LCD.
Figure 16:
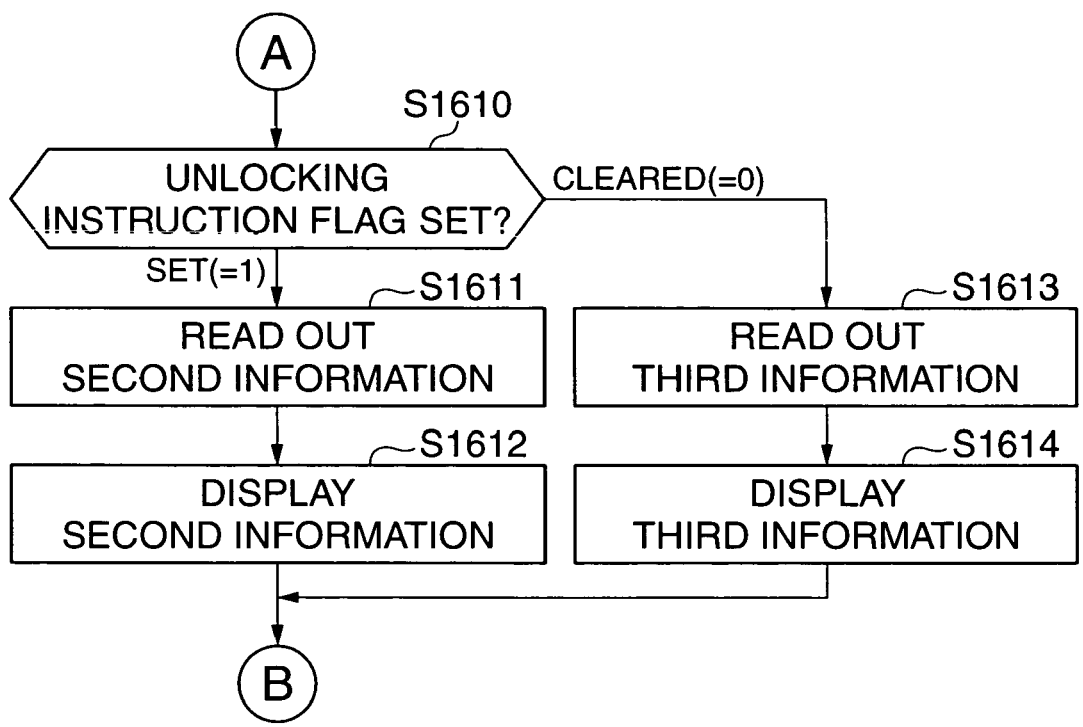
FIG. 16 is a continued part of the flowchart in FIG. 15.

FIGS. 15 and 16 are a flowchart showing a display process for displaying on the LCD 132, executed by the display circuit section 105A' of the array cartridge 100A.

Steps S1200 to S1204 in FIGS. 15 and 16 are identical to the steps S1200 to S1204 described hereinabove with reference to FIG. 12, and therefore description thereof is omitted. If it is determined in the step S1202 that the opening/closing-storing flag is equal to the value (=1) indicative of the "Open" state ("Open" in the step S1202), the MPU 130 determines, based on the value of the unlocking instruction flag, whether or not the unlocking instruction has been received from the infrared remote control unit 139 (step S1610).

If the unlocking instruction has been received from the infrared remote control unit 139. (i.e. the unlocking instruction flag is equal to 1) ("Set" in the step S1610), the MPU 130 reads out the second information stored in advance in the ROM of the MPU 130 (step S1611), and displays the second information on the LCD 132 (step S1612). On the other hand, if the unlocking instruction has not been received from the infrared remote control unit 139 (i.e. the unlocking instruction flag is set to 0) ("Cleared" in the step S1610), the MPU 130 reads out third information stored in advance in the ROM of the MPU 130 (step S1613), and displays the third information on the LCD 132 (step S1614). Thereafter, the steps S1200 et seq. are repeatedly executed.

In this process, if a character string, such as "Cover was opened in response to the unlocking instruction from the remote control unit", is stored as the second information in the ROM of the MPU 130, and a character string, such as "Cover was opened unauthorizedly", is stored as the third information in the ROM of the MPU 130, a user can know whether the cover 103 was opened authorizedly or unauthorizedly. Although not shown in FIGS. 15 and 16, information indicative of whether the cover 103 is locked or unlocked may be constantly displayed on the LCD 132 separately from the first, second, and third information.

Further, although in the above-described embodiment the first information is stored in the nonvolatile memory 131, and the second and third information are stored in the ROM of the MPU 130, of course, all the first to third information may be stored in the nonvolatile memory 131. In this case, however, it is desirable to configure such that the second and third information cannot be freely rewritten by a user. Further, the second or third information may be displayed on the LCD 132 not separately but in a manner added to the first information.

As described above, according to the present embodiment, there is provided a locking means for locking and unlocking the cover 103 of the array cartridge 100A, and information indicating that the cover 103 was opened is not simply displayed on the LCD 132, but the information is displayed in different forms depending on the manner in which the cover 103 was opened (i.e. whether the cover 103 was opened authorizedly or unauthorizedly). This method is very effective in detecting and preventing unauthorized use or tampering of the hard disk devices 101 accommodated in the array cartridge 100A.

The present invention is not limited to the above described embodiments, but various changes and modifications can be made thereto.

For example, in the first and second embodiments, authenticating processing executed to determine whether or not the third control section 209 is allowed to be activated, i.e. whether or not information stored in the hard disk devices 101 can be loaded into the third control section 209 is carried out by the second control section 208 separate from the third control section 209 to be activated (for loading).

However, the processing for loading information stored in the hard disk devices 101 into the third control section 209 is executed by the BIOS program stored in the ROM 221 of the third control section 209.

Therefore, the authenticating processing carried out by the second control section 208 may be executed by the BIOS program stored in the third control section 209. In this case, the processing for acquiring the ID information 225 from the nonvolatile memory 204 of the first control section 200 may be carried out by either of the second control section 208 and the third control section 209.

Further, in this case, instead of activating the third control section 209 after a successful authentication, as in the first and second embodiments, it is necessary for the second control section 208 to activate the third control section 209 immediately after having acquired the ID information 225 from the nonvolatile memory 204 of the first control section 200 (in the case where the ID information 225 is acquired by the second control section 208) or immediately after having been activated (in the case where the ID information 225 is acquired by the third control section 209).

Needless to say, also in the case where authenticating processing is executed by the third control section 209, the third control section 209 supplies electric power to the hard disk devices 101 only after a successful authentication, so as to activate the hard disk devices 101 and load the system program and the like therefrom.

Further, the present invention can also be applied to a case where a system program is stored in a hard disk device or the like within an information processing apparatus, but not in hard disk devices within a disk array device.

Furthermore, the present invention is also applicable to a case where an information processing apparatus does not have a plurality of separate control sections as in the first and second embodiments.

Moreover, the present invention may be applied to a disk array device (cartridge device) containing a plurality of disk-shaped storage mediums, such as magnetic-optical disk devices.

Although in the third and fourth embodiments, the lithium battery is employed as a battery mounted on the display circuit section 105A (15') of the array cartridge 100A, this is not limitative, but a secondary battery or a solar battery may be used, or alternatively a combination of different kinds of batteries may be used. Further, power supply to the display circuit section 105A (105A') from the main unit 102A is not necessarily required, but the display circuit section 105A (105A') may be constantly operated by a battery.

Further, although in the third and fourth embodiments, when the array cartridge 100A is mounted into the main unit 102A, the opening/closing-storing flag and the unlocking instruction flag are automatically cleared (set to 0), the flags may be cleared not automatically but in response to respective instructions from the main unit 102A after the array cartridge 100A has been mounted into the main unit 102A.

Furthermore, although in the fourth embodiment, the unlocking instruction is transmitted from the infrared remote control unit 139 to the display circuit section 105A' of the array cartridge 100A, the unlocking instruction may also be transmitted from the main unit 102A, for example.

It is to be understood that the object of the present invention may also be accomplished by supplying a computer or a CPU with a program of software which realizes the functions of any of the above described embodiments (a program corresponding to any of the flowcharts in FIGS. 3, 4, 10 to 12, and 14 to 16), and causing the computer or the CPU to read out and execute the program.

In this case, the program may be supplied directly from a storage medium storing the same, or by downloading from a computer, database, or the like, not shown, that is connected to the Internet, a commercial network, a local area network, or the like.

In this case, the form of the program may be an object code, a program code executed by an interpreter, or script data supplied to an OS (Operating System).

It is to be understood that the object of the present invention may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program-code itself read from the storage medium realizes the functions of any of the embodiments described above, and hence the storage medium in which the program code is stored constitutes the present invention.

Examples of the storage medium for supplying the program code include a ROM, a RAM, an NV-RAM, a floppy (registered trademark) disk, a hard disk, an optical disk (registered trademark), a magnetic-optical disk, a CD-ROM, a CD-R, a CD-RW, a DVD-ROM, a DVD-RAM, a DVD-RW, a DVD+RW, a magnetic tape, and a nonvolatile memory card.

Moreover, it also goes without saying that the functions of any of the embodiments described above may be realized not necessarily by causing the computer to read and execute the program code, but alternatively by causing an operating (OS) system running on the computer to perform part or all of the actual processing based on instructions in the program code.

What is claimed is:

1. An information processing system comprising:
   an information processing apparatus;
   a plurality of disk devices;
   a disk array device accommodating said disk devices and removably mounted in said information processing apparatus;
   a cover device that covers said disk array device; and
   a control device,
   wherein said disk array device comprises a storage device that stores authentication information for use in authentication by said information processing apparatus,
   wherein said information processing apparatus comprises an acquiring device that acquires the authentication information and opening and closing history in which at least one of opening or closing of said cover device is recorded from said storage device, an authenticating device that performs a process for authenticating said disk array device by using the authentication information acquired by said acquiring device, and a reading device that reads out information from at least one of said disk devices,
   wherein said reading device reads out the information from at least one of said disk devices when authentication by said authenticating device is successful, and
   wherein said control device prevents said reading device from reading out the information from at least one of said disk devices when the at least one of opening or closing of said cover device is recorded in the opening and closing history.

2. An information processing system as claimed in claim 1, wherein when said authenticating device fails in the authentication based on the authentication information acquired from said storage device by said acquiring device, said authenticating device performs a further process for authenticating said disk array device by using manually inputted information.

3. An information processing system as claimed in claim 1, wherein said information processing apparatus comprises a changing device that automatically changes the authentication information stored in said storage device, after said disk array device has been authenticated by said authenticating device.

4. An information processing apparatus that is capable of having a disk array device removably mounted therein, the disk array device accommodating a plurality of disk devices, comprising:
   a cover device that covers the disk array device;
   an acquiring device that acquires opening and closing history in which at least one of opening or closing of said cover device is recorded; and
   a control device that limits access to information of the plurality of disk devices when the at least one of opening or closing of said cover device is recorded in the opening and closing history.

5. A method of controlling an information processing apparatus that is capable of having a disk array device removably mounted therein, the disk array device accommodating a plurality of disk devices and having a cover device covering the disk array devices and a storage device that stores predetermined authentication information, the method comprising the steps of:
   acquiring the predetermined authentication information and opening and closing history in which at least one of opening or closing of the cover device is recorded from the storage device;
   authenticating the disk array device by using the acquired authentication information;
   reading out information from at least one of the disk devices when the disk array device is successfully authenticated; and
   preventing the information processing apparatus from reading out the information from at least one of the disk devices when the at least one of opening or closing of the cover device is recorded in the opening and closing history.

6. A computer-readable medium storing a computer program for controlling an information processing apparatus having a disk array device removably mounted therein, the disk array device accommodating a plurality of disk devices and including a cover device covering the disk array device, the computer program comprising:
   an acquiring module for acquiring authentication information and opening and closing history in which at least one of opening or closing of the cover device is recorded from a storage device;
   an authenticating module for authenticating the disk array device by using the acquired authentication information;
   a reading module for reading out information from at least one of the disk devices when the disk array device is successfully authenticated; and
   a preventing module for preventing the information processing apparatus from reading out the information from at least one of the disk devices when the at least one of opening or closing of the cover device is recorded in the opening and closing history.

* * * * *